(12) United States Patent
Morris et al.

(10) Patent No.: US 8,791,177 B2
(45) Date of Patent: Jul. 29, 2014

(54) ELASTOMER COMPOSITE WITH SILICA-CONTAINING FILLER AND METHODS TO PRODUCE SAME

(75) Inventors: Michael D. Morris, Nashua, NH (US); Anand Prakash, Wilmington, MA (US); Frederick H. Rumpf, Billerica, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 13/820,332

(22) PCT Filed: Sep. 14, 2011

(86) PCT No.: PCT/US2011/051584
§ 371 (c)(1),
(2), (4) Date: Mar. 1, 2013

(87) PCT Pub. No.: WO2012/037244
PCT Pub. Date: Mar. 22, 2012

(65) Prior Publication Data
US 2013/0158164 A1 Jun. 20, 2013

Related U.S. Application Data

(60) Provisional application No. 61/383,182, filed on Sep. 15, 2010.

(51) Int. Cl.
| | | |
|---|---|---|
| *B01F 1/00* | (2006.01) | |
| *B29B 7/90* | (2006.01) | |
| *C08C 1/14* | (2006.01) | |
| *C08K 9/06* | (2006.01) | |
| *C08J 3/22* | (2006.01) | |
| *C08L 7/02* | (2006.01) | |
| *C08J 3/215* | (2006.01) | |
| *C08L 9/10* | (2006.01) | |
| *B29B 7/46* | (2006.01) | |
| *C08K 3/36* | (2006.01) | |
| *B29B 9/12* | (2006.01) | |

(52) U.S. Cl.
CPC .............. *C08J 3/22* (2013.01); *C08J 2321/02* (2013.01); *B29B 7/90* (2013.01); *C08K 3/36* (2013.01); *B29B 9/12* (2013.01); *C08C 1/14* (2013.01); *C08K 9/06* (2013.01); *C08L 7/02* (2013.01); *C08J 3/215* (2013.01); *C08L 9/10* (2013.01); *B29B 7/465* (2013.01)
USPC ........................... 523/318; 524/492; 524/495

(58) Field of Classification Search
USPC .................................. 523/318; 524/492, 495
See application file for complete search history.

(56) References Cited

U.S. PATENT DOCUMENTS

| | | | |
|---|---|---|---|
| 4,578,411 A | 3/1986 | Budd et al. | |
| 5,763,388 A | 6/1998 | Lightsey et al. | |
| 6,028,137 A | 2/2000 | Belmont et al. | |
| 6,048,923 A | 4/2000 | Andrews et al. | |
| 6,075,084 A * | 6/2000 | Mabry et al. ................... | 524/495 |
| 6,365,663 B2 | 4/2002 | Mabry et al. | |
| 6,800,126 B2 | 10/2004 | Magnus et al. | |
| 6,929,783 B2 | 8/2005 | Chung et al. | |
| 7,105,595 B2 | 9/2006 | Mabry et al. | |
| 2003/0195276 A1 | 10/2003 | Mabry et al. | |

FOREIGN PATENT DOCUMENTS

| | | |
|---|---|---|
| EP | 0763558 | 3/1997 |
| JP | 2006-152213 | 6/2006 |
| WO | WO 96/37547 | 11/1996 |
| WO | WO 01/10946 | 2/2001 |
| WO | WO 2011/051215 | 5/2011 |

OTHER PUBLICATIONS

Database CA (Online) Chemical Abstracts Service, Colombus, Ohio, US; Jun. 15, 2006, Ajiro, Yukitoshi: "Modified Natural Rubber-based Pneumatic Tires with High Wet-skid Resistance and Wear Resistance", XP002664365, retrieved from STN Database Accession No. 2006:560426, Abstract JP 2006 152213 A (Bridgestone Corp) Jun. 15, 2006.
Byers, John T., Silane Coupling Agents for Enhanced Silica Performance, Rubber World, vol. 218, Issue 6, Sep. 1998, p. 38-47.
Tokita, et al., Future Carbon Blacks and New Concept of Advanced Filler Dispersion, Society of Rubber Industry Japan, vol. 71, No. 9, 1998, p. 522-533.
Wang, et al., Carbon-Silica Dual Phase Filler, A New Generation Reinforcing Agent for Rubber: Part IX. Application to Truck Tire Tread Compound, Rubber Chemistry and Technology, vol. 74, 2001, p. 124-137.
International Preliminary Report on Patentability received in International Application No. PCT/US2011/051584, mailed on Jan. 8, 2013.
Written Opinion of the International Searching Authority received in International Application No. PCT/US2011/051584, mailed on Jul. 23, 2012.

* cited by examiner

*Primary Examiner* — Edward Cain

(57) ABSTRACT

An elastomer composite with silica-containing filler is described, along with methods to make the same. The advantages achieved with the elastomer composite and methods are further described.

38 Claims, 6 Drawing Sheets

ELASTOMER COMPOSITE WITH SILICA-CONTAINING FILLER AND METHODS TO PRODUCE SAME

This application is a national phase application under 35 U.S.C. §371 of International Application Number PCT/US2011/051584, filed on Sep. 14, 2011, which claims priority to U.S. Provisional Patent Application No. 61/383,182, filed on Sep. 15, 2010, the disclosure of which is incorporated herein by reference.

The present invention relates to elastomer composites and, in particular, elastomer composites containing silica-containing filler(s) and further relates to methods to produce elastomer composites containing silica-container filler(s) and articles made from the elastomer composite or which contain the elastomer composite.

Numerous products of commercial significance are formed of elastomeric compositions wherein particulate filler is dispersed in any of various synthetic elastomers, natural rubber or elastomer blends. Carbon black, for example, is widely used as a reinforcing agent in natural rubber and other elastomers. It is common to produce a masterbatch, that is, a premixture of filler, elastomer and various optional additives, such as extender oil. Carbon black masterbatch is prepared with different grades of commercially available carbon black which vary both in surface area per unit weight and in structure, which describes the size and complexity of aggregates of carbon black formed by the fusion of primary carbon black particles to one another. Numerous products of commercial significance are formed of such elastomeric compositions of carbon black particulate filler dispersed in natural rubber. Such products include, for example, vehicle tires wherein different elastomeric compositions may be used for the tread portion, sidewalls, wire skim and carcass. Other products include, for example, engine mount bushings, conveyor belts, windshield wipers and the like.

Good dispersion of carbon black in natural rubber compounds has been recognized for some time as one of the most important objectives for achieving good quality and consistent product performance, and considerable effort has been devoted to the development of procedures for assessing dispersion quality in rubber. The mixing operations have a direct impact on mixing efficiency and on macro-dispersion. In general, better carbon black macro-dispersion is achieved in a dry-mixed masterbatch by longer mixing and by more intensive mixing. Unfortunately, however, achieving better macro-dispersion by longer, more intensive mixing degrades the elastomer into which the carbon black is being dispersed. This is especially problematic in the case of natural rubber, which is highly susceptible to mechanical/thermal degradation. Longer and more intensive mixing, using known mixing techniques and apparatus, such as an internal mixer, reduces the molecular weight of the natural rubber masterbatch-composition. Thus, improved macro-dispersion of carbon black in natural rubber is known to be achieved with a corresponding, generally undesirable reduction in the molecular weight of the rubber.

In addition to dry mixing techniques, it is known to continuously feed latex and a carbon black slurry to an agitated coagulation tank. Such "wet mix" techniques are often used with synthetic elastomer, such as styrene butadiene rubber (SBR). The coagulation tank contains a coagulant such as salt or an aqueous acid solution typically having a pH of about 2.5 to 4. The latex and carbon black slurry are mixed and coagulated in the coagulation tank into small beads (typically a few millimeters in diameter) referred to as wet crumb. The crumb and acid effluent are separated, typically by means of a vibrating shaker screen or the like. The crumb is then dumped into a second agitated tank where it is washed to achieve a neutral or near neutral pH. Thereafter the crumb is subjected to additional vibrating screen and drying steps and the like. Variations on this method have been suggested for the coagulation of natural and synthetic elastomers. In commonly owned U.S. Pat. No. 4,029,633 to Hagopian et al., a continuous process for the preparation of elastomer masterbatch is described. An aqueous slurry of carbon black is prepared and mixed with a natural or synthetic elastomer latex. This mixture undergoes a so-called creaming operation, optionally using any of various known creaming agents. Following the creaming of the carbon black/latex mixture, it is subjected to a coagulation step. Specifically, the creamed carbon black/latex mixture is introduced as a single coherent stream into the core of a stream of coagulating liquor. The solid stream of creamed carbon black/latex mixture is said to undergo shearing and atomizing by the stream of coagulating liquor prior to coagulation, being then passed to a suitable reaction zone for completion of the coagulation. Following the coagulation step, the crumb is separated from the waste product "serum," washed, and dried. A somewhat similar process is described in U.S. Pat. No. 3,048,559 to Heller, et al. An aqueous slurry of carbon black is continuously blended with a stream of natural or synthetic elastomer or latex. The two streams are mixed under conditions described as involving violent hydraulic turbulence and impact. As in the case of the Hagopian patent mentioned above, the combined stream of carbon black slurry and elastomer latex is subsequently coagulated by the addition of an acid or salt coagulant solution.

There are a variety of methods for producing masterbatch. In one method, disclosed in U.S. Pat. No. 6,048,923, the contents of which are incorporated by reference herein, a continuous flow of a first fluid including an elastomer latex is fed to the mixing zone of a coagulum reactor. A continuous flow of a second fluid including a carbon black slurry is fed under pressure to the mixing zone to form a mixture with the elastomer latex. The mixing of the two fluids is sufficiently energetic to substantially completely coagulate the elastomer latex with the carbon black prior to a discharge end of the coagulum reactor. As disclosed in U.S. Pat. No. 6,929,783, the coagulum may then be fed to a dewatering extruder. For some applications, it is desirable to employ blends of elastomers to optimize the mechanical properties of the masterbatch and/or a vulcanized rubber product of the masterbatch. Blends of elastomers may be produced by dry-mixing two polymers together. Alternatively, blends may be produced by co-coagulating a mixture of elastomer latices (see, e.g., U.S. Pat. No. 4,271,213) or by recovering a polymer blend from a mixture of an elastomer latex and a solution containing a second polymer (see, e.g., U.S. Pat. No. 5,753,742).

U.S. Pat. No. 6,521,691 discloses a wet masterbatch method in which two polymer emulsions and a filler slurry may be combined and then coagulated to form a masterbatch. Similarly, U.S. Pat. No. 6,800,126 discloses that carbon black aggregates may be blended with an oil and a low-molecular weight elastomer latex to form a pre-blend, which preblend may be combined with an emulsion of a diene-based elastomer. A composite of the elastomer and the carbon black is then recovered from the mixture. U.S. Pat. No. 4,578,411 discloses a method in which an elastomer latex, an elastomer solution, and a filler are combined, following which a composite of the two elastomers with the filler is recovered. However, all of these references disclose the combination of the filler with the elastomer and the coagulation of the latex as separate processing steps. Between these two process stages, the filler can flocculate in the emulsion to the detriment of its even distribution in the final composite.

Elastomer compositions containing silica or particulates containing silica regions or phases have been made. For instance, U.S. Pat. No. 6,028,137 (and related patents) describes elastomeric compounds that include an elastomer and a silicon-treated carbon black and, optionally, a coupling agent. The silicon-treated carbon black is an aggregate, wherein silicon-containing species are distributed through at least a portion of the carbon black aggregate and form an intrinsic part of the carbon black. The '137 patent and related patents generally relate to the use of the silicon-treated carbon blacks in forming dry mix masterbatches. The use of silicon-treated carbon blacks have shown promise with regard to their use in elastomeric compounds, but additional improvements in performance in articles formed from elastomeric compounds have been desired.

When silicon-treated carbon black (as well as other silica-containing filler) was used in a wet masterbatch process, including the use of a coagulum reactor, it was expected that the use of silicon-treated carbon black would promote the advantages achieved with silicon-treated carbon blacks as explained in prior patents. It was discovered, however, that the expected advantages were not achieved. For instance, the tread wear for elastomeric composites formed using silicon-treated carbon black was not the same as using a carbon black filler, such as a N134 or N234 carbon black, even when the wet mix coagulation process of U.S. Pat. No. 6,075,084 was used. This was perplexing because it was commonly believed that the use of a wet mix coagulum reactor and mixing a first fluid of elastomer latex with a second fluid of a silicon-treated carbon black under pressure would lead to the same advantages achieved using this process that were achieved when carbon black was used. In these studies, additives were used in forming the elastomer composite, which included a coupling agent to enhance silicon-treated carbon black interaction with the elastomer and an antioxidant to minimize oxidative degradation of the elastomer during processing and storage.

Accordingly, there is a need to overcome the problems in making elastomer composites having a silica-containing filler in a wet masterbatch process, such as one that makes use of a coagulum reactor, so as to achieve the beneficial properties that are commonly achieved using wet masterbatch processes, such as those that use a coagulum reactor.

SUMMARY OF THE PRESENT INVENTION

A feature of the present invention is to provide methods to produce elastomer composites using a wet masterbatch process which permits the use of a silica-containing filler, coupling agent, and at least one further additive, like an antioxidant, and yet achieves desirable performance properties.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to the controlled and selective placement or introduction of a coupling agent and a further additive, like an antioxidant, in a wet masterbatch process that forms an elastomer composite.

For example, the present invention relates to a method of making an elastomer composite in a wet mix process. The method includes, but is not limited to, combining a first fluid comprising elastomer latex with a second fluid comprising particulate silica-containing filler in a mixing zone of a coagulum reactor. For purposes of the present invention, it is to be understood that coagulum reactor does not mean that a chemical reaction is necessarily occurring in the coagulum reactor. The coagulum reactor includes a chamber (e.g., mixing chamber) where the first fluid and second fluid are combined or mixed together such that the latex coagulates. In the present application, the chamber or mixing chamber is sometimes referred to as the mixing zone of the coagulum reactor. The method further includes, but is not limited to, introducing at least one coupling agent and introducing at least one further additive, like an antioxidant, during the method to make the elastomer composite, such that the silica-containing filler contacts the coupling agent prior to the silica-containing filler contacting the further additive.

Also, the present invention relates to a method of producing an elastomer composite, that includes, but is not limited to, feeding a continuous flow of first fluid comprising elastomer latex to a coagulum reactor; and feeding a continuous flow of second fluid comprising particulate silica-containing filler under pressure to the coagulum reactor to form a mixture with the elastomer latex. Preferably, the particulate silica-containing filler is effective to coagulate the elastomer latex. Also, preferably, the feeding of the second fluid against the first fluid within the coagulum reactor is sufficiently energetic to coagulate at least a portion of the elastomer latex with the particulate silica-containing filler in the coagulum reactor. The method further includes, but is not limited to, introducing at least one coupling agent and introducing at least one further additive, like an antioxidant, such that the particulate silica-containing filler contacts the coupling agent prior to the silica-containing filler contacting the further additive.

Furthermore, the present invention relates to a method of making an elastomer composite in a wet mix process using a single stage addition of latex. The method includes, but is not limited to, combining a first fluid comprising elastomer latex with a second fluid comprising particulate silica-containing filler in a mixing zone. The method further includes, but is not limited to, introducing at least one coupling agent and introducing at least one further additive, like an antioxidant, during the method to make the elastomer composite, wherein the coupling agent and the further additive are added at about the same time during the method, and wherein the elastomer latex is introduced as a single stage addition.

The present invention also relates to a method of producing an elastomer composite using a coagulum reactor or reactor zone and a single stage addition of latex. The method includes, but is not limited to, feeding a continuous flow of first fluid comprising elastomer latex to a coagulum reactor; and feeding a continuous flow of second fluid comprising particulate silica-containing filler under pressure to the coagulum reactor to form a mixture with the elastomer latex. Preferably, the particulate silica-containing filler is effective to coagulate the elastomer latex. Also, preferably, the feeding of the second fluid against the first fluid within the coagulum reactor is sufficiently energetic to coagulate at least a portion of the elastomer latex with the particulate silica-containing filler in the coagulum reactor. The method further includes, but is not limited to, introducing at least one coupling agent and introducing at least one further additive, like an antioxidant, in the method that forms the elastomer composite, wherein the coupling agent and the further additive are introduced at about the same time and wherein the elastomer latex is introduced as a single stage addition.

Further, the present invention relates to a method of making an elastomer composite in a wet mix process and using a multi-stage addition of the latex. The method includes, but is not limited to, combining a first fluid comprising elastomer latex with a second fluid comprising particulate silica-containing filler in a mixing zone. The method further includes, but is not limited to, introducing at least one coupling agent and introducing at least one further additive, like an antioxidant, during the method that forms the elastomer composite, wherein the coupling agent and the further additive are added at about the same time during the method, and wherein the elastomer latex is introduced as a multi stage addition.

In addition, the present invention relates to a method of producing an elastomer composite that includes, but is not limited to, feeding a continuous flow of first fluid comprising elastomer latex to a coagulum reactor; and feeding a continuous flow of second fluid comprising particulate silica-containing filler under pressure to the coagulum reactor to form a mixture with the elastomer latex. Preferably, the particulate silica-containing filler is effective to coagulate the elastomer latex. Also, preferably, the feeding of the second fluid against the first fluid within the coagulum reactor is sufficiently energetic to coagulate at least a portion of the elastomer latex with the particulate silica-containing filler in the coagulum reactor. The method further includes, but is not limited to, introducing at least one coupling agent and introducing at least one further additive, like an antioxidant, in the method to produce the elastomer composite, wherein the coupling agent and the further additive are introduced at about the same time and wherein the elastomer latex is introduced as a multi stage addition.

The present invention further relates to elastomer composites formed from any one or more the processes of the present invention. The present invention relates to articles that are made from or include the elastomer composite(s) of the present invention.

Also, the present invention relates to an elastomer composite having at least one elastomer, silicon-treated carbon black, at least one coupling agent, and at least one further additive, like an antioxidant. Preferably, the elastomer is natural rubber or includes natural rubber. The silicon-treated carbon black can be present in an amount of from about 40 to 60 phr or other amounts. When cured by heating in a heated press set at 150° C. for a time determined by a conventional rubber rheometer (i.e., T90+10% of T90, where T90 is the time to achieve 90% vulcanization), the elastomer composite has a tan delta, measured at 60° C., of less than 0.130. For example, tan delta may be at most 0.120, at most 0.110, or at most 0.100

The present invention, in addition, relates to an elastomer composite having at least one elastomer, at least one silica-containing particulate filler, at least one coupling agent, and at least one further additive, like an antioxidant. Preferably, the elastomer latex is or includes natural rubber latex. The silica-containing filler can be present in an amount of from about 40 to 90 phr (or other amounts). The elastomer composite has a T300/T100:tan delta (tan delta measured at 60° C.) ratio of 47 to 70, for example, from 50 to 55, from 55 to 60, from 60 to 65, or from 65 to 70.

The present invention further relates to an elastomer composite having at least one elastomer, at least one silica-containing particulate filler, at least one coupling agent, and at least one further additive, like an antioxidant. The silica-containing filler can be present in an amount of from about 10 to 90 phr (or other amounts). Where the further additive is an antioxidant, the elastomer composite, as produced, has a free antioxidant level of at least 70% by mass of the antioxidant present in the composite, for example, from 75% to 90%, from 80% to 95%, or from 85% to 99%.

It is to be understood that both the foregoing general description and the following detailed description are exemplary and explanatory only and are intended to provide a further explanation of the present invention, as claimed.

The accompanying drawings, which are incorporated in and constitute a part of this application, illustrate various features of the present invention and together with the description, serve to explain the principles of the present invention.

DETAILED DESCRIPTION OF THE PRESENT INVENTION

Figure 1:
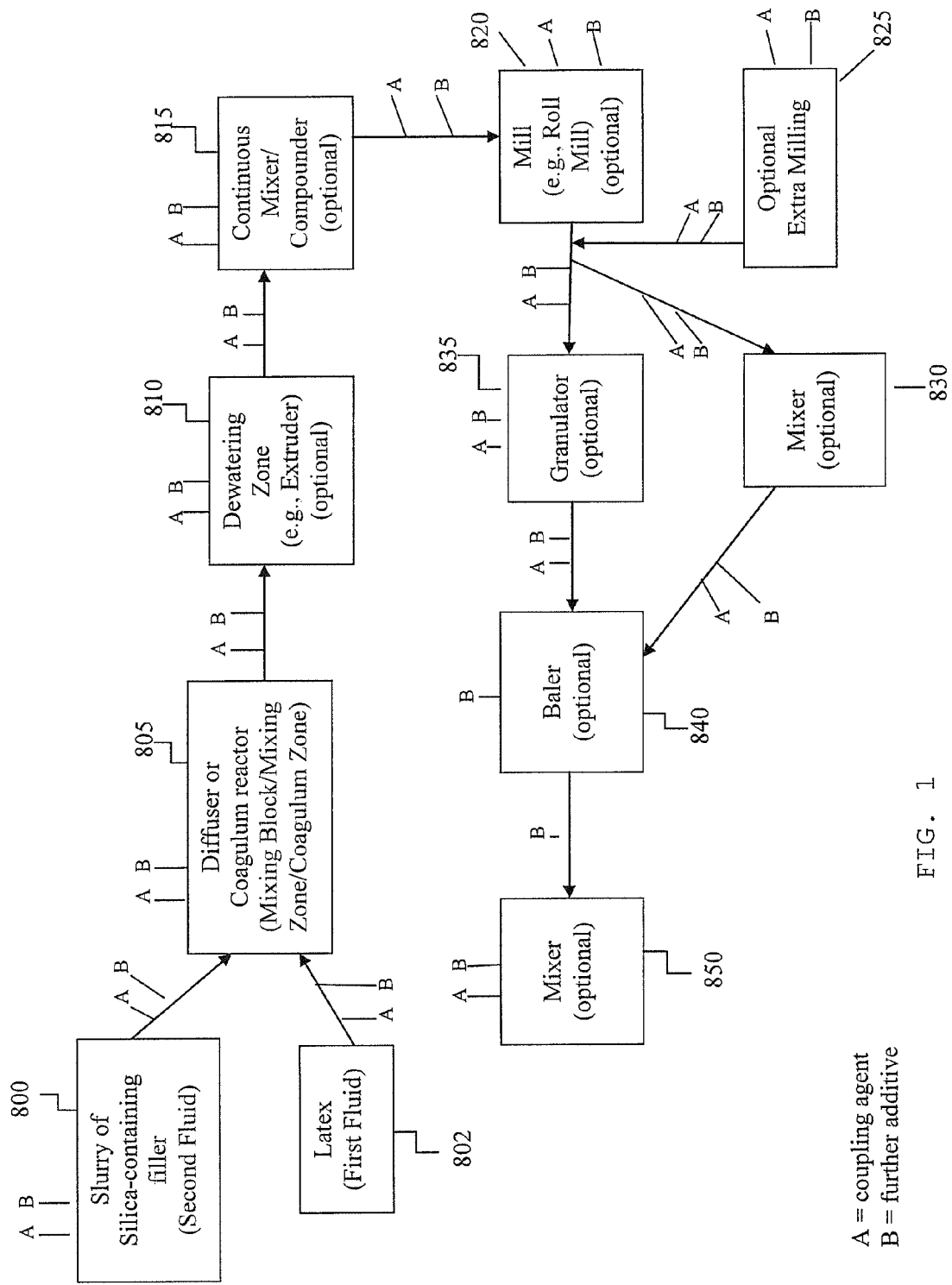
FIG. 1 is a schematic flow chart illustration of process steps that can be used in the processes of the present invention.

The present invention relates to the selective or strategic introduction of at least one coupling agent and at least one further additive, such as an antioxidant, into an elastomer composite formulation, which includes at least one silica-containing filler and at least one elastomer latex. Without the selective or strategic introduction of at least one coupling agent and at least one further additive, like at least one antioxidant, the use of a silica-containing filler in a wet masterbatch process, such as one using a coagulum reactor or other coagulating chamber or mixing chamber of an apparatus for carrying out a wet mix coagulation process, would not lead to the beneficial properties that should be achieved with such processes. Furthermore, with the present invention and the selective and strategic introduction of at least one coupling agent and at least one further additive, such as at least one antioxidant, in a wet masterbatch process that includes at least one silica-containing filler and at least one elastomer latex, it is possible to achieve even more improved properties than expected with such processes, and therefore achieve performance properties previously not achievable using this technology.

For purposes of the present invention, a "further additive" as used herein is additive that is added to the elastomer latex and is not an elastomer or filler. The "further additive" would be in addition to the filler(s) present and elastomers present. For instance, the "further additive" can be one or more antioxidants. The "further additive" can be one or more degradation inhibitors. In the alternative, the "further additive" can be processing agents and/or extenders and the like that would compete with the coupling agent and thereby prevent the coupling agent from attaching onto the filler. In the details below, one example of a "further additive" is mentioned, namely, an antioxidant, but it is to be understood, that this is for exemplary purposes only.

More specifically, it has been discovered with the present invention that in making an elastomer composite through a wet masterbatch process, using at least one antioxidant, at least one coupling agent, and a silica-containing filler, if the antioxidant is permitted to contact, attach, or react with the silica-containing filler in the absence of the coupling agent, this can lead to a decrease in performance properties of the elastomer composite. Without wishing to be bound by any particular theory, it is believed that if the antioxidant is permitted to contact the silica-containing filler without any competition from the coupling agent, the antioxidant has the ability to prevent the coupling agent from attaching onto the reaction sites of the silica-containing filler and thereby substantially prevent the advantages achieved with a coupling agent in association with a silica-containing filler.

With the present invention, essentially two approaches are described with regard to this finding. First, an elastomer composite can be made in a wet mix or wet masterbatch process, wherein a first fluid, including at least the elastomer latex, is mixed with a second fluid that contains at least a particulate silica-containing filler to form an elastomer composite, wherein the coupling agent is introduced in a manner such that the silica-containing filler contacts the coupling agent prior to the silica-containing filler contacting the antioxidant. By way of this process, this permits the coupling agent to attach, react, or otherwise be in contact with the silica-containing filler without any competition from the antioxidant and, therefore, the full advantages of the coupling agent-silica-containing filler interaction can be achieved. This method could be considered a sequential addition or sequential process with regard to the coupling agent and antioxidant.

The second approach involves making an elastomer composite in a wet mix or wet masterbatch process, wherein a first fluid containing at least an elastomer latex is combined with a second fluid containing at least a particulate silica-containing filler to form an elastomer composite, and at least one coupling agent and at least one antioxidant are introduced in this method such that the coupling agent and antioxidant are added at about the same time. In this approach, the coupling agent has some potential competition from the presence of the antioxidant, but by being equally present or nearly equally present with the antioxidant, the coupling agent has the ability to interact with the silica-containing filler to achieve the desirable performance advantages with wet mix processing. The interference of having the antioxidant present with the coupling agent is far less interfering than having an antioxidant introduced first and contacting the silica-containing filler first without any competition from a coupling agent.

With regards to the silica-containing filler, one or more types of silica-containing filler can be used in any of the processes of the present invention. As described herein, the second fluid contains or includes the particulate silica-containing filler(s). The "second fluid" can be introduced on a continuous basis, semi-continuous basis, or batch basis. The "second fluid" can be introduced through one inlet or injection point or through more than one inlet or injection point for purposes of any of the processes of the present invention.

For purposes of the present invention, the silica-containing filler includes any filler which contains a silica content of at least 0.1% by weight, based on the weight percent of the filler. The silica-containing filler can contain a silica weight percent of at least 0.3 wt %, at least 0.5 wt %, at least 1 wt %, at least 5 wt %, at least 7.5 wt %, at least 10 wt %, at least 15 wt %, at least 17.5 wt %, at least 20 wt %, at least 25 wt %, at least 30 wt %, at least 35 wt %, at least 40 wt %, at least 50 wt %, at least 60 wt %, at least 70 wt %, at least 80 wt %, at least 90 wt %, or from 0.1 wt % to 100 wt %, from 2 wt % to 100 wt %, from 5 wt % to 99 wt %, from 10 wt % to 90 wt %, from 15 wt % to 90 wt %, from 15 wt % to 50 wt %, from 15 wt % to 35 wt %, or less than or equal to 50 wt % and any other weight percents, all weight percents based on the total weight of the silica-containing filler. The silica-containing filler can be or include precipitated silica, fumed silica, silica-coated carbon black, and/or silicon-treated carbon black. Any of the silica-containing fillers can be chemically functionalized, such as to have attached chemical groups, such as attached organic groups. Any combination of silica-containing fillers can be used. Further, the silica-containing filler(s) can be used in combination with, as an option, any non-silica-containing filler, such as carbon black(s).

In silicon-treated carbon black, a silicon containing species, such as an oxide or carbide of silicon, is distributed through at least a portion of the carbon black aggregate as an intrinsic part of the carbon black. Conventional carbon blacks exist in the form of aggregates, with each aggregate consisting of a single phase, which is carbon. This phase may exist in the form of a graphitic crystallite and/or amorphous carbon, and is usually a mixture of the two forms. Carbon black aggregates may be modified by depositing silicon-containing species, such as silica, on at least a portion of the surface of the carbon black aggregates. The result may be described as silicon-coated carbon blacks.

The materials described herein as silicon-treated carbon blacks are not carbon black aggregates which have been coated or otherwise modified, but actually represent a different kind of aggregate having two phases. One phase is carbon, which will still be present as graphitic crystallite and/or amorphous carbon, while the second phase is silica (and possibly other silicon-containing species). Thus, the silicon-containing species phase of the silicon-treated carbon black is an intrinsic part of the aggregate; it is distributed throughout at least a portion of the aggregate. A variety of silicon-treated blacks are available from Cabot Corporation under the name Ecoblack™. It will be appreciated that the multiphase aggregates are quite different from the silica-coated carbon blacks mentioned above, which consist of pre-formed, single phase carbon black aggregates having silicon-containing species deposited on their surface. Such carbon blacks may be surface-treated in order to place a silica functionality on the surface of the carbon black aggregate as described in, e.g., U.S. Pat. No. 6,929,783.

The silicon-treated carbon black can include silicon-containing regions primarily at the aggregate surface of the carbon black, but still be part of the carbon black and/or the silicon-treated carbon black can include silicon-containing regions distributed throughout the carbon black aggregate. The silicon-treated carbon black can be oxidized. The silicon-treated carbon black can contain from about 0.1% to about 50% silicon by weight, based on the weight of the silicon-treated carbon black. These amounts can be from about 0.5 wt % to about 25 wt %, from about 1 wt % to about 15 wt % silicon, from about 2 wt % to about 10 wt %, from about 3 wt % to about 8 wt %, from about 4 wt % to about 5 wt % or to about 6 wt %, all based on the weight of the silicon-treated carbon black.

One of skill in the art will recognize that, separately from the silicon content of the silicon-treated carbon black, the surface of the particle may also have varying amounts of silica and carbon black. For example, the surface area of the silicon-treated carbon black may include from about 5% to about 95% silica, for example, from about 10% to about 90%, from about 15% to about 80%, from about 20% to about 70%, from about 25% to about 60%, from about 30% to about 50%, or from about 35% to about 40%, for example, up to about 20% or up to about 30% silica. The amount of silica at the surface may be determined by the difference between the surface areas of the particles as measured by iodine number (ASTM D-1510) and nitrogen adsorption (i.e., BET, ASTM D6556).

The particulate filler slurry ("the second fluid") may be produced according to any technique known to those of skill in the art. In an exemplary method employing silica-containing filler, such as pellets, the filler can be combined with water, and the resulting mixture is passed through a colloid mill, pipeline grinder, or the like to form a dispersion fluid. This fluid is then passed to a homogenizer that more finely disperses the filler in the carrier liquid to form the slurry. Exemplary homogenizers include but are not limited to the Microfluidizer® system commercially available from Microfluidics International Corporation (Newton, Mass., USA). Also suitable are homogenizers such as models MS 18, MS45 and MC 120 Series homogenizers available from the APV Homogenizer Division of APV Gaulin, Inc. (Wilmington, Mass., USA). Other suitable homogenizers are commercially available and will be apparent to those skilled in the art given the benefit of the present disclosure. The optimal operating pressure across the homogenizer may depend on the actual apparatus, the filler composition and the filler content. As an example, the homogenizer may be operated at a pressure from about 10 psi to about 5000 psi or higher, for example, about 10 psi to about 1000 psi, about 1000 psi to about 1700 psi, about 1700 psi to about 2200 psi, about 2200 psi to about 2700 psi, about 2700 psi to about 3300 psi, about 3300 psi to about 3800 psi, about 3800 psi to about 4300 psi, or about 4300 psi to about 5000 psi. Depending on the wet masterbatch method employed, a high filler content may be used to reduce the task of removing excess water or other carrier. In the preferred wet masterbatch method described herein, about 5 to 30 weight percent filler may be employed, for example, from about 5 to about 9 weight percent, from about 9 to about 12 weight percent, from about 12 to about 16 weight percent, from about 16 to about 20 weight percent, from about 20 to about 24 weight percent, from about 24 to about 27 weight percent, or from about 27 to about 30 weight percent, based on the weight percent of the masterbatch. Those skilled in the art will recognize, given the benefit of this disclosure, that the filler content (in weight percent) of the slurry should be coordinated with other process variables during the wet masterbatch process to achieve a desired filler content (in phr) in the ultimate product.

The slurry can be used in masterbatch production immediately upon being prepared. Fluid conduits carrying the slurry and any optional holding tanks and the like can establish or maintain conditions which substantially preserve the dispersion of the filler in the slurry. That is, substantial reagglomeration or settling out of the particulate filler in the slurry should be prevented or reduced to the extent reasonably practical.

As used herein, the term "aggregate" refers to the smallest dispersible unit of the filler. For example, carbon black aggregates are made up of primary particles of carbon black and generally cannot be broken into smaller pieces by mechanical forces. As used herein, the term "agglomerate" refers to a plurality of aggregates in physical contact with one another and held together by physical forces. These agglomerates may be broken by mechanical forces into smaller units or particles; the smaller units may be aggregates, smaller agglomerates, or both.

With regard to the "first fluid," which contains at least one elastomer latex, the first fluid can contain one or more elastomer latices. Suitable elastomer latex fluids include both natural and synthetic elastomer latices and latex blends. The latex should be appropriate for the wet masterbatch process selected and the intended purpose or application of the final rubber product. It will be within the ability of those skilled in the art to select suitable elastomer latex or a suitable blend of elastomer latices for use in the methods and apparatus disclosed here, given the benefit of this disclosure. Exemplary elastomers include, but are not limited to, rubbers, polymers (e.g., homopolymers, copolymers and/or terpolymers) of 1,3-butadiene, styrene, isoprene, isobutylene, 2,3-dialkyl-1,3-butadiene, where alkyl may be methyl, ethyl, propyl, etc., acrylonitrile, ethylene, propylene and the like. The elastomer may have a glass transition temperature (Tg), as measured by differential scanning calorimetry (DSC), ranging from about −120° C. to about 0° C. Examples include, but are not limited to, styrene-butadiene rubber (SBR), natural rubber and its derivatives such as chlorinated rubber, polybutadiene, polyisoprene, poly(styrene-co-butadiene) and the oil extended derivatives of any of them. Blends of any of the foregoing may also be used. The latex may be in an aqueous carrier liquid. Particular suitable synthetic rubbers include: copolymers of from about 10 to about 70 percent by weight of styrene and from about 90 to about 30 percent by weight of butadiene such as a copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl-2-vinylpyridine, 5-ethyl-2-vinylpyridine, 2-methyl-5-vinylpyridine, allyl-substituted acrylates, vinyl ketone, methyl isopropenyl ketone, methyl vinyl either, alphamethylene carboxylic acids and the esters and amides thereof such as acrylic acid and dialkylacrylic acid amide. Also suitable for use herein are copolymers of ethylene and other high alpha olefins such as propylene, 1-butene and 1-pentene. As noted further below, the rubber compositions can contain, in addition to the elastomer and filler and coupling agent, various processing aids, oil extenders, antidegradents, and/or other additives.

Exemplary natural rubber latices include, but are not limited to, field latex, latex concentrate (produced, for example, by evaporation, centrifugation or creaming), skim latex (e.g., the supernatant remaining after production of latex concentrate by centrifugation) and blends of any two or more of these in any proportion. The latex should be appropriate for the wet masterbatch process selected and the intended purpose or application of the final rubber product. The latex is provided typically in an aqueous carrier liquid. Selection of a suitable latex or blend of latices will be well within the ability of those skilled in the art given the benefit of the present disclosure and the knowledge of selection criteria generally well recognized in the industry.

Elastomer composites can be prepared with a filler loading of at least about 40 phr, at least about 50 phr, at least about 55 phr, at least about 60 phr, at least about 65 phr, or at least about 70 phr of carbon black, for example, from about 40 to about 70 phr, from about 50 to about 75 phr, from about 55 to about 80 phr, from 60 to about 85 phr, from 65 to about 90 phr, from 70 to about 90 phr, from 40 to about 60 phr, between 50 and about 65 phr, from 55 to about 80 phr, from about 60 to about 90 phr, from about 65 to about 80 phr, or from about 70 to about 80 phr.

With regard to the coupling agent, one or more coupling agents are used in any of the processes of the present invention. The coupling agent can be or include one or more silane coupling agents, one or more zirconate coupling agents, one or more titanate coupling agents, one or more nitro coupling agents, or any combination thereof. The coupling agent can be or include bis(3-triethoxysilylpropyl)tetrasulfane (e.g., Si 69 from Evonik Industries, Struktol SCA98 from Struktol Company), bis(3-triethoxysilylpropyl)disulfane (e.g., Si 75 and Si 266 from Evonik Industries, Struktol SCA985 from Struktol Company), 3-thiocyanatopropyl-triethoxy silane (e.g., Si 264 from Evonik Industries), gamma-mercaptopropyl-trimethoxy silane (e.g., VP Si 163 from Evonik Industries, Struktol SCA989 from Struktol Company), gamma-mercaptopropyl-triethoxy silane (e.g., VP Si 263 from Evonik Industries), zirconium dineoalkanolatodi(3-mercapto) propionato-O, N,N'-bis(2-methyl-2-nitropropyl)-1,6-diaminohexane, and/or coupling agents that are chemically similar or that have the one or more of the same chemical groups. Additional specific examples of coupling agents, by commercial names, include, but are not limited to, VP Si 363 from Evonik Industries. The coupling agent can be present in any amount in the elastomer composite. For instance, the coupling agent can be present in the elastomer composite in an amount of at least 0.2 parts per hundred parts of silica (by mass) in the silica-containing filler, from about 0.2 to 60 parts per hundred of silica in the silica-containing filler, from about 1 to 30 parts per hundred of silica in the silica-containing filler, from about 2 to 15 parts per hundred of silica in the silica-containing filler, or from about 5 to 10 parts per hundred of silica in the silica-containing filler. As an option, the coupling agent can be used in an amount of from about $7*10^{-7}$ mol/m$^2$ of silica to about $1.2*10^{-7}$ mol/m$^2$ of silica, for example, about $9*10^{-7}$ mol/m$^2$ to about $9.5*10^{-7}$ mol/m$^2$ of silica, for example, about $9.3*10^{-7}$ mol/m$^2$ of silica.

With regard to the antioxidant, one or more antioxidants can be used in any of the processes of the present invention. The antioxidant (an example of a degradation inhibitor) can be an amine type antioxidant, phenol type antioxidant, imidazole type antioxidant, metal salt of carbamate, para-phenylene diamine(s) and/or dihydrotrimethylquinoline(s), polymerized quinine antioxidant, and/or wax and/or other antioxidants used in elastomer formulations. Specific examples include, but are not limited to, N-(1,3-dimethylbutyl)-N-phenyl-p-phenylenediamine (6-PPD, e.g., ANTIGENE 6C, available from Sumitomo Chemical Co., Ltd. and NOCLAC 6C, available from Ouchi Shinko Chemical Industrial Co., Ltd.), "Ozonon" 6C from Seiko Chemical Co., Ltd., polymerized 1,2-dihydro-2,2,4-trimethyl quinoline (TMQ, e.g., Agerite Resin D, available from R. T. Vanderbilt), butylhydroxytoluene (BHT), and butylhydroxyanisole (BHA), and the like. Other representative antioxidants may be, for example, diphenyl-p-phenylenediamine and others such as, for example, those disclosed in The Vanderbilt Rubber Handbook (1978), pages 344-346, which is incorporated in its entirety by reference herein. An antioxidant and an antiozonate are collectively degradation inhibitors. These degradation inhibitors illustratively include a chemical functionality, such as an amine, a phenol, an imidazole, a wax, a metal salt of an imidazole, and combinations thereof. Specific degradation inhibitors operative herein illustratively include N-isopropyl-N'-phenyl-p-phenylenediamine, N-(1-methylheptyl)-N-phenyl-p-phenylenediamine, 6-ethoxy-2,2,4-trimethyl-1, 2-dihydroquinoline, N,N'-diphenyl-p-phenylenediamine, octylated diphenylamine, 4,4'-bis(a,a'-dimethylbenzyl) diphenylamine, 4,4'-dicumyl-diphenylamine, 2,5-di-tert-butyl-hydroquinone, 2,2'-methylene-bis(4-methyl-6-tert-butylphenol), 2,2'-methylenebis(4-methyl-6-methylcyclohexlphenol), 4,4'-thio-bis(3-methyl-6-tert-butylphenol), 4,4'-butylidene-bis(3-methyl-6-tert-butylphenol), tris(nonylated phenyl)phosphite, tris-(2,4-di-t-butylphenyl)phosphite, 2-mercaptobenzimidazole, and zinc 2-mercaptobenzimidazole. An example includes at least one amine and one imidazole. Optionally, a polymerized quinoline can be used. The relative amounts of antioxidants can include 0.5 to 3 parts amine, 0.5 to 2.5 parts imidazole, and 0.5 to 1.5 parts of optional polymerized quinoline. The degradation inhibiting amine can be 4,4'-bis(alpha-dimethylbenzyl)diphenylamine, the imidazole can be zinc 2-mercaptotoluimidazole and the polymerized quinoline can be polymerized 1,2-dihydro-2,2,4-trimethylquinoline. In general, the degradation inhibitors (e.g., the antioxidant(s)) are typically present from 0.1 to 20 parts by weight per 100 parts by weight of polymer or rubber system (phr). Typical amounts of antioxidants may comprise, for example, from about 1 to about 5 phr.

In general, the present invention relates to producing an elastomer composite using a wet mix process, which can also be known as a wet masterbatch process. The wet mix process or wet masterbatch process can produce what is known as a masterbatch crumb. As stated earlier, the present invention relates to a wet mix process or wet masterbatch process wherein at least one elastomer latex is combined with a fluid containing at least silica-containing filler and the combination of these two fluids can occur in a mixing zone or chamber of any sort, and, further, the process involves introducing at least one coupling agent and introducing at least one antioxidant in the process. The process can include combining a first fluid containing at least an elastomer latex with a second fluid containing at least a particulate silica-containing filler and causing the elastomer latex to coagulate, thereby forming a masterbatch, such as a masterbatch crumb. The at least one coupling agent and the at least one antioxidant are incorporated in the method of making the wet masterbatch or masterbatch crumb or elastomer composite at one or more stages where the at least one silica-containing filler and at least one antioxidant can be incorporated into the elastomer composite, and wherein the silica-containing filler contacts the coupling agent prior to the silica-containing filler contacting the antioxidant.

In the alternative (as a different process), or as an additional step (to the above process), the coupling agent and the antioxidant can be added at about the same time.

In any process herein, the elastomer latex can be introduced as a single stage addition or can be introduced in two or more stages, such as a multi-stage addition.

The masterbatch crumb may be produced using any wet masterbatch process, including those discussed below and processes such as those disclosed in, e.g., U.S. Pat. Nos. 5,763,388; 6,048,923; 6,841,606; 6,646,028; 7,101,922; 3,335,200; and 3,403,121, and other wet masterbatch processes known to those of skill in the art. In general, an elastomer latex fluid and a particulate slurry are combined, and the elastomer latex is caused to coagulate to form a masterbatch crumb. The masterbatch crumb may be dewatered to form a dewatered coagulum.

One particular example of a wet mix process or a wet masterbatch process to produce an elastomer composite or masterbatch crumb includes feeding a continuous flow of a first fluid that contains at least elastomer latex, for example, via latex feed 903 (FIG. 1a), to a coagulum reactor (e.g., a mixing zone of a coagulum reactor, for example, mixing zone 901 of coagulum reactor 900 (FIG. 1a)). The method further includes feeding a continuous flow of a second fluid containing at least a silica-containing filler (e.g., a silica-containing particulate filler), which is generally fed under pressure, for example, via one or more slurry tips 902, to the coagulum reactor to form a mixture with the elastomer latex. The particulate filler is effective to coagulate the elastomer latex and the feeding of the second fluid against the first fluid in the coagulum reactor is sufficiently energetic to coagulate at least a portion of the elastomer latex with the particulate silica-containing filler in the coagulum reactor. The feeding of the second fluid against the first fluid is generally sufficiently energetic to fully or substantially coagulate the elastomer latex with the particulate silica-containing filler in the coagulum reactor. The method further includes introducing at least one coupling agent and introducing at least one antioxidant such that the particulate silica-containing filler contacts the coupling agent prior to the silica-containing filler contacting the antioxidant.

As an alternative method or in addition to the method above, the method to make the elastomer composite or masterbatch crumb can involve introducing the coupling agent and antioxidant at about the same time or at the same time. The elastomer latex, as an option, can be introduced as a single stage addition, as a two-stage addition, or as two or more stage additions (e.g., multi-stage addition).

With regard to the coupling agent, the coupling agent can be introduced to the first fluid at any point prior to the coagulum reactor or mixing zone. The coupling agent can be introduced to the second fluid at any point prior to the coagulum reactor or mixing zone. The coupling agent can be introduced to the second fluid at any point prior to the coagulum reactor or mixing zone and the antioxidant can be introduced to the first fluid at any point prior to the coagulum reactor or mixing zone. The coupling agent can be introduced to the coagulum reactor or mixing zone as long as the coupling agent contacts the silica-containing filler prior to the silica-containing filler contacting the antioxidant and/or the coupling agent contacts the silica-containing filler at about the same time as the silica-containing filler contacts the antioxidant.

The coupling agent can be introduced to the mixture in the mixing zone (for example, via feed 904 in FIG. 1a) or after exiting the mixing zone, for example, in diffuser portion 905, or following discharge of the elastomer composite from the coagulum reactor, for example, coagulum reactor 900.

As stated, in general, any of the processes of the present invention can comprise discharging a substantially continuous flow of an elastomer composite from the coagulum reactor or coagulating zone or chamber or mixing zone. Any of the processes of the present invention can further include conducting one or more post-processing steps after the elastomer composite exits the coagulum reactor. The coupling agent can be introduced in any one or more of these post-processing steps and/or the antioxidant can be introduced in any one or more of the post-processing steps. As an option, any subsequent dry mixing of the elastomer composite with additional elastomer or other ingredients can be achieved to form an elastomer composite blend.

As one example, in any method of producing an elastomer composite using a coagulum reactor (or any coagulating zone or chamber), the method can further include one or more of the following steps:

after exiting the coagulating zone, one or more dewatering steps can be used to de-water the mixture to obtain a de-watered mixture;

after exiting the coagulating zone, the elastomer composite, which can be coagulated, can be mixed or compounded one or more times to obtain a compounded mixture;

after exiting the coagulating zone, the elastomer latex, which can be coagulated at this point, can be subjected to one or more milling steps to obtain a milled mixture;

after exiting the coagulating zone, the elastomer composite, which can be coagulated, can be granulated one or more times and/or further mixed one or more times;

after exiting the coagulating zone, the elastomer composite, which can be coagulated, can be baled to obtain a baled product or mixture;

the baled mixture or product can be broken apart to form a granulated mixture.

As a further example, in the present invention, the following sequence of steps can occur and each step can be repeated (with the same or different settings) any number of times:

dewatering the mixture (e.g., the elastomer composite exiting the coagulating zone) to obtain a dewatered mixture;

mixing or compounding the dewatered mixture to obtain a compounded mixture;

milling the compounded mixture to obtain a milled mixture (e.g., roll milling);

granulating or mixing the milled mixture;

optionally baling the mixture after the granulating or mixing to obtain a baled mixture;

optionally breaking apart the baled mixture and mixing.

In any of the processes of the present invention, the coupling agent can be introduced in any of the steps (or in multiple steps or locations) as long as the coupling agent has an opportunity to become dispersed in the elastomer composite and so long as the coupling agent is initially introduced prior to and/or at about the same time as the antioxidant. For instance, the coupling agent can be introduced just prior to and/or during the dewatering step. The coupling agent can be introduced just prior to and/or during a mixing or compounding step (e.g., a continuous mixing step that masticates the mixture or mixes the mixture such that new surfaces are generated or exposed, such that further water can be removed from the mixture). The coupling agent can be introduced just prior to and/or during a milling step (e.g., one or more milling steps, such as a roll milling step). The coupling agent can be introduced just prior to and/or during a granulating or mixing step. The antioxidant can be introduced just prior to and/or during a dewatering step. The antioxidant can be introduced just prior to and/or during a mixing or compounding step (e.g., a continuous mixing step that masticates the mixture or mixes the mixture such that new surfaces are generated or exposed, such that further water can be removed from the mixture). The antioxidant can be introduced just prior to and/or during a milling step (e.g., one or more milling steps, such as a roll milling step). The antioxidant can be introduced just prior to and/or during a granulating or mixing step. The antioxidant can be introduced just prior to and/or during a baling step. In a process where the breaking apart of the baled mixture occurs, the antioxidant can be introduced just prior to and/or during the breaking apart of the baled mixture and/or introduced just prior to and/or during any subsequent mixing.

In a process where the antioxidant is added to a liquid phase during the wet mix process, the antioxidant can be added as a dispersion in water. Such a dispersion may be stabilized by surfactants known to those of skill in the art, for example, fatty acid type dispersants. An exemplary antioxidant dispersion is Aquanox, a 50% dispersion in water of TMQ (2,2,4-trimethyl-1,2-dihydroquinoline) from Aquaspersions Ltd. (Halifax, West Yorkshire, England).

In any of the post-processing steps described herein, as stated, the coupling agent and the antioxidant can be introduced at about the same time. For purposes of the present invention, "about the same time" means that the coupling agent and antioxidant are introduced into the same zone or in the same (or about the same) physical location of the process. However, the introduction of the coupling agent and antioxidant do not need to be introduced at the same injection point. The introduction of the coupling agent and antioxidant can occur through the same injection point or through different injection points. The introduction of the coupling agent and antioxidant can occur as a single combined formulation (or liquid) or as separate formulations (or liquids). A more specific example of the process where the coupling agent and antioxidant are introduced at about the same time would be where the coupling agent is introduced into the coagulum reactor and the antioxidant is also introduced into the same coagulum reactor, e.g., within 1 second, or less, of each other. In another example, the coupling agent and antioxidant are introduced to one or more of the post processing steps, such as dewatering or roll milling, within 1 minute or less of each other, such as within 30 seconds or less of each other, such as 10 seconds or less of each other, or such as 1 second or less of each other. These times would apply to any insertion point in any process for purposes of achieving the introduction of the coupling agent and antioxidant at "about the same time."

It is further understood that the term "introduced just prior to" means that the coupling agent and/or antioxidant is introduced at a point or injection point immediately prior to a processing step. For instance, if the coupling agent is introduced "just prior" to a mixing or compounding step, this means that no other processing step occurs between the introduction of the coupling agent and the mixing or compounding step.

In any process of the present invention, it is to be understood that the coupling agent can be introduced in one or more stages and/or the antioxidant can be introduced in one or more stages. The introduction of the coupling agent and/or antioxidant can be done on a continuous basis, semi-continuous basis, or batch basis. It is further to be understood that while the processes of the present invention relate to the introduction of at least one coupling agent prior to and/or at about the same time as the antioxidant with respect to the silica-containing filler, once this "rule" has been complied with, or as an option, any optional subsequent introduction of any further coupling agent and/or further antioxidant can be done in any order of addition even to the extent that antioxidant is added prior to any further introduction of coupling agent. Further, it is to be understood that the introduction of coupling agent can occur at one injection point or multiple injection points and/or the introduction of antioxidant can occur in one or more injection points. Any combination is possible. For instance, the coupling agent can be added prior to and/or at about the same time as the antioxidant with regard to contacting the silica-containing filler, but the process can further include additional introduction of antioxidant at any stage of the process that occurs after the initial introduction of the coupling agent and antioxidant.

Figure 1A:
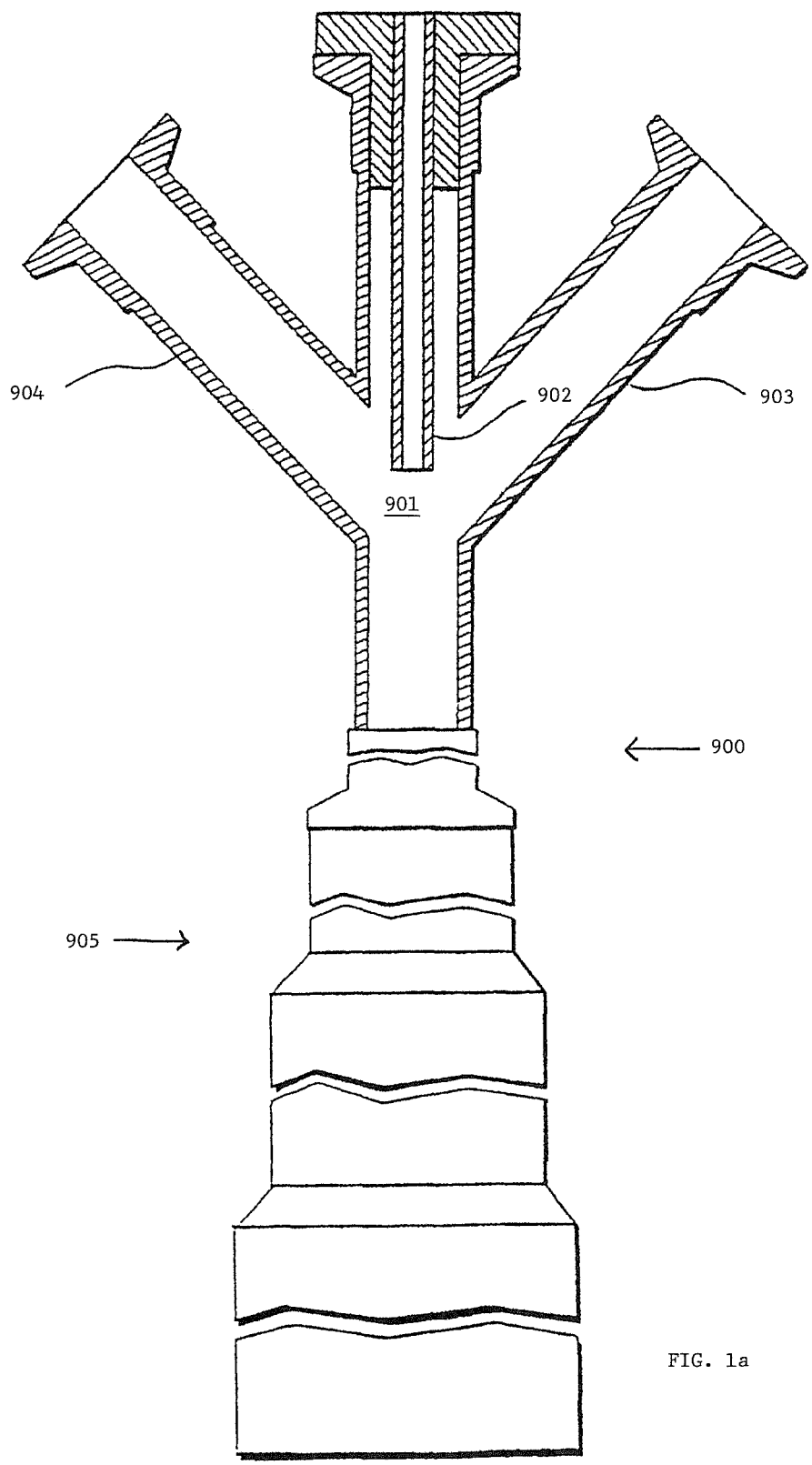
FIG. 1a is a schematic diagram of an example of an apparatus for preparing elastomer masterbatch of the present invention.

FIG. 1 sets forth an example, using a block diagram of various steps that can occur in the formation of the elastomer composite of the present invention. As shown in FIG. 1, the slurry of silica-containing filler (second fluid) 800 is introduced into the diffuser or coagulum reactor 805 and the fluid containing the latex (first fluid) 802 is introduced also into diffuser or coagulum reactor 805. As an option, the elastomer composite (e.g., elastomer crumb) exits the diffuser or coagulum reactor 805 and can enter a dewatering zone 810; can optionally enter a continuous mixer/compounder 815; can optionally enter a mill (e.g., open mill, also called a roll mill) 820; can be subjected to additional extra milling 825 (same or different conditions as mill 820) (such as same or higher energy input); can be subjected to optional mixing by mixer 830, and/or can be granulated using a granulator 835, and then can optionally be baled, using a baler 840, and can optionally be broken down by use of an additional mixer 850. As shown in FIG. 1, injection (or addition) point A and injection (or addition) point B are indicated throughout the process. It is to be understood that each of these injection (addition) points, wherein A relates to injection or addition of a coupling agent and B relates to the injection or addition of a further additive, like an antioxidant, are exemplary injection (addition) points, and one or more of these points can be used for either A and/or B. Any combination of injection (or addition) points and any number of injection (or addition) points can be used as long as a coupling agent first contacts the silica-containing filler prior to and/or at about the same time as the further additive, like an antioxidant, contacts the silica-containing filler.

Further details of the process using a coagulum reactor and other post-processing steps are set forth below and can be used in any of the processes of the present invention.

The masterbatch crumb can be produced in a continuous flow process involving a mixture of elastomer latex and silica-containing particulate filler fluids at turbulence levels and flow control conditions sufficient to achieve coagulation even without use of traditional coagulating agents. Such methods are disclosed, for example, in U.S. Pat. No. 6,048,923. In brief, an exemplary method for preparing masterbatch crumb involves feeding simultaneously a slurry of filler and a rubber latex fluid or other suitable elastomer fluid to a mixing zone of a coagulum reactor. A coagulum zone extends from the mixing zone, preferably progressively increasing in cross-sectional area in the downstream direction from an entry end to a discharge end. The slurry is fed to the mixing zone preferably as a continuous, high velocity, e.g., 60-100 m/s, jet of injected fluid, while the natural rubber latex (and/or other latex) fluid is fed at relatively low velocity. The high velocity, flow rate and particulate concentration, e.g., 10-17 weight percent, of the filler slurry are sufficient to cause mixture and high shear of the latex fluid, flow turbulence of the mixture within at least an upstream portion of the coagulum zone, and substantially completely coagulate the elastomer latex prior to the discharge end. Substantially complete coagulation can thus be achieved without the need for an acid or salt coagulation agent, but such an agent can be optionally used at this point.

After the substantially complete coagulation of the elastomer latex and particulate fluid, masterbatch crumb in the form of "worms" or globules is formed and discharged from the discharge end of the coagulum reactor as a substantially constant flow concurrently with the on-going feeding of the latex and filler slurry streams into the mixing zone of the coagulum reactor. Notably, the plug-type flow and atmospheric or near atmospheric pressure conditions at the discharge end of the coagulum reactor are highly advantageous in facilitating control and collection of the elastomer composite product, such as for immediate or subsequent further processing steps. The masterbatch crumb is created and then formed into a desirable extrudate, for example, having about 70-85% water content. After formulation, the masterbatch crumb can be passed to suitable drying and compounding apparatus.

Figure 2:
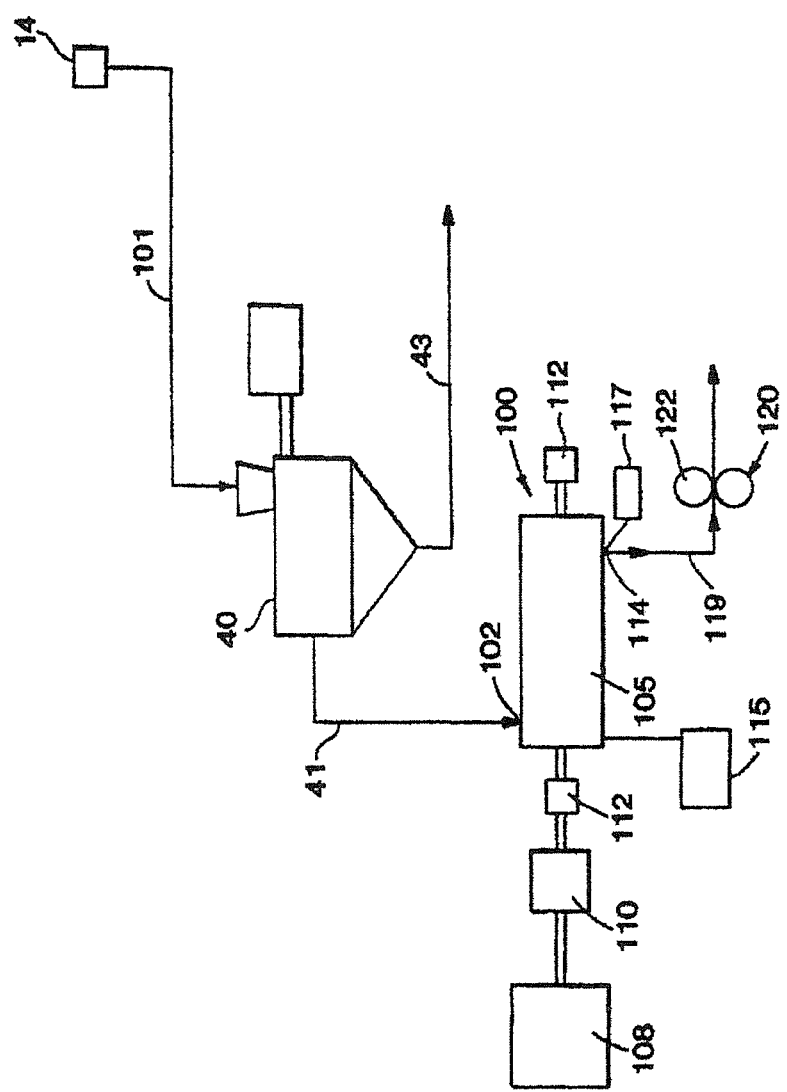
FIG. 2 is a schematic flow chart illustration of an example of an apparatus and method for preparing elastomer masterbatch of the present invention.
Figure 3:
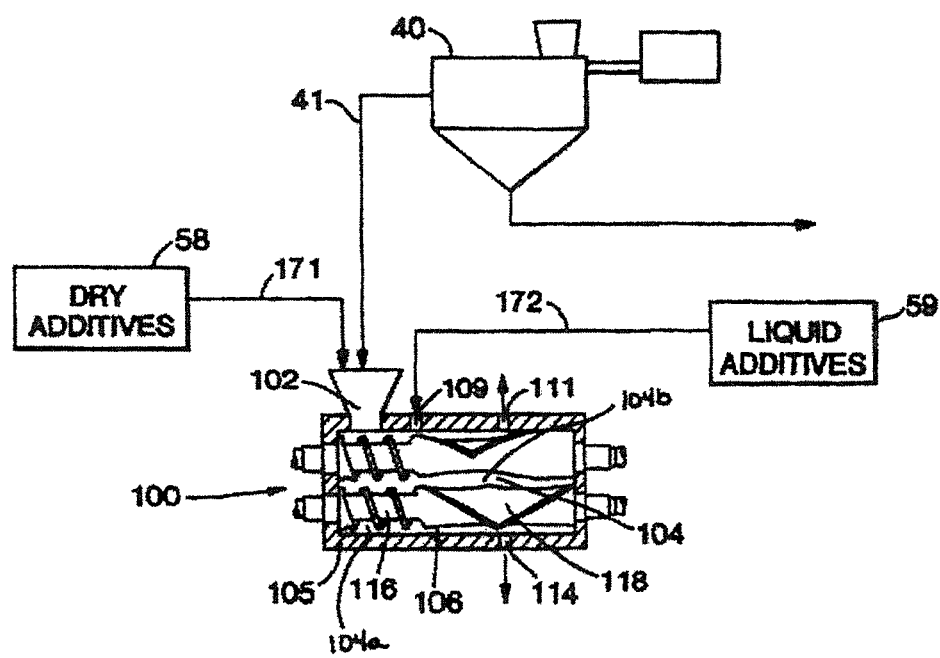
FIG. 3 is a schematic flowchart of a portion of an alternative embodiment of the masterbatch production line of FIG. 2 showing the continuous compounder of FIG. 2 in section.

As just one example, in FIGS. 2 and 3, the masterbatch crumb is passed from coagulum reactor 14 via conveying means 101, which may be a simple gravity drop or other suitable apparatus, to a dewatering extruder 40. Suitable dewatering extruders are well known and commercially available from, for example, the French Oil Mill Machinery Co. (Piqua, Ohio, USA). Water is discharged from dewatering extruder 40 via effluent stream 43.

The dewatering extruder may bring rubber masterbatch crumb from, e.g., approximately 70-85% water content to approximately 1% to 20% water content, for example, from about 1% to about 3% water content, from about 3% to about 5% water content, from about 4% to about 6% water content, from about 5% to about 10% water content, from about 10% to about 15% water content, from about 13% to about 17% water content, or from about 15% to about 20% water content. The dewatering extruder can be used and reduce the water content of a rubber extrudate to about 15% or other amounts. The optimal water content may vary with the elastomer employed, the type of filler, and the devices employed for mastication of the dewatered coagulum. Regardless of the wet masterbatch method employed, masterbatch crumb may be dewatered to a desired water content, following which the resulting dewatered coagulum is further masticated while being dried to a desired moisture level (e.g., from about 0.5% to about 3%, for example, from about 0.5% to about 1%, from about 1% to about 3%, about 2% to about 3%, or from about 1% to about 2%, all weight percent based on total weight of coagulum). The mechanical energy imparted to the material can provide improvement in rubber properties. For example, the dewatered coagulum may be mechanically worked with one or more of a continuous mixer, an internal mixer, a twin screw extruder, a single screw extruder, or a roll mill. This optional mixing step after the coagulating step (e.g., downstream of the coagulum reactor) can have the ability to masticate the mixture and/or generate surface area or expose surface which can permit removal of water (at least a portion thereof) that may be present in the mixture. Suitable masticating devices are well known and commercially available, including for example, a Unimix Continuous Mixer and MVX (Mixing, Venting, eXtruding) Machine from Farrel Corporation of Ansonia, Conn., a long continuous mixer from Pomini, Inc., a Pomini Continuous Mixer, twin rotor corotating intermeshing extruders, twin rotor counterrotating non-intermeshing extruders, Banbury mixers, Brabender mixers, intermeshing-type internal mixers, kneading-type internal mixers, continuous compounding extruders, the biaxial milling extruder produced by Kobe Steel, Ltd., and a Kobe Continuous Mixer. Alternative masticating apparatus suitable for use with the present invention will be familiar to those of skill in the art.

As dewatered coagulum is processed in a desired apparatus, the apparatus imparts energy to the material. Without being bound by any particular theory, it is believed that friction generated during mechanical mastication heats the dewatered coagulum. Some of this heat is dissipated by heating and vaporizing the moisture in the dewatered coagulum. Without wishing to be bound by any particular theory, it is believed that practically all water removed from the dewatered coagulum via mastication is removed by heating the water and evaporating it, not by squeezing it from the coagulum. Thus, depending on how mastication occurs in a particular apparatus, the optimal moisture content for the dewatered coagulum will vary. The temperature of the dewatered coagulum within an apparatus may ramp up to a certain level, be maintained at a particular level, or both. The temperature should be sufficiently high to rapidly vaporize water that becomes exposed to the atmosphere within the apparatus, but not so high as to scorch the rubber. The dewatered coagulum can achieve a temperature from about 130° C. to about 180° C., such as from about 140° C. to about 160° C., especially when the coupling agent is added prior to or during mastication. The coupling agent can include a small amount of sulfur, and the temperature should be maintained at a sufficiently low level to prevent the rubber from cross-linking during mastication.

As an option, at least about 0.9 MJ/kg, for example, at least about 1.3 MJ/kg, at least about 1.7 MJ/kg, at least about 2 MJ/kg, at least about 2.3 MJ/kg, or at least about 2.6 MJ/kg of energy may be imparted to the material. About 3 MJ/kg to about 4 MJ/kg of energy can be imparted to the material. The optimal amount of energy will depend on the apparatus being used, the temperature of the dewatered coagulum during processing, the filler structure and loading, and the water content of the dewatered coagulum.

As an option, additives can be combined with the dewatered coagulum in the mechanical mixer. Specifically, additives such as filler (which may be the same as, or different from, the filler used in the coagulum reactor; exemplary fillers include silica and zinc oxide, with zinc oxide also acting as a curing agent), other elastomers, other or additional masterbatch, antiozonants, plasticizers, processing aids (e.g., stearic acid, which can also be used as a curing agent, liquid polymers, oils, waxes, and the like), resins, flame-retardants, extender oils, lubricants, and a mixture of any of them, can be added in the mechanical mixer. Additional elastomers can be combined with the dewatered coagulum to produce elastomer blends. Exemplary elastomers include, but are not limited to, rubbers, polymers (e.g., homopolymers, copolymers and/or terpolymers) of 1,3-butadiene, styrene, isoprene, isobutylene, 2,3-dialkyl-1,3-butadiene, where alkyl may be methyl, ethyl, propyl, etc., acrylonitrile, ethylene, propylene, and the like. Methods of producing masterbatch blends are disclosed in our commonly owned U.S. Pat. Nos. 7,105,595, 6,365,663, and 6,075,084.

FIG. 3 schematically illustrates a subsystem 58 for introducing dry additives via conduit 171 and feed port 102 into continuous compounder 100. Also schematically illustrated in FIG. 3 is subsystem 59 for introducing liquid additives via conduit 172 and feed port 109 into continuous compounder 100. Conduits 171 and 172 may be, for example, pipes, conveyor belts, or other suitable apparatus for transporting material from the respective subsystem to continuous compounder 100. It is to be appreciated that any combination of elastomers, additives and additional masterbatch may be added to the dewatered coagulum in continuous compounder 100.

In FIGS. 2 and 3, the dewatered coagulum can be fed from dewatering extruder 40 via conveyor or simple gravity drop or other suitable apparatus 41 into feed port 102 formed in an elongate processing chamber 104 of continuous compounder 100. Feed port 102 can be a feed hopper which facilitates a gravity drop of the dewatered coagulum from dewatering extruder 40. Feed port 102 may also be fed via a conveyance such as a conveyor belt, conduit, pipe, or any other suitable apparatus for transporting elastomer masterbatch. Processing chamber 104 can be contained within housing 105 of continuous compounder 100. Elongate rotors 106 are seen to be parallel to each other and axially oriented in processing chamber 104. Rotors 106 are driven by motor 108 via gear reducer 110 and bearings 112. Rotors 106 are adapted in accordance with known designs for processing material axially through elongate processing chamber 104. As seen in FIG. 3, multiple rotors 106 are axially oriented in processing chamber 104. Rotors 106 preferably are segmented, with different segments optionally having different thread or screw configurations. Processing chamber 104 can house two rotors 106 having different profiles. Suitable rotors 106 having different profiles include, for example, rotor model numbers 7 and 15 from Farrel Corporation of Ansonia Conn. One of skill in the art will recognize that alternative rotor combinations may be suitable for particular elastomer masterbatch compositions depending on the elastomer composition, the filler composition, the filler morphology, the loading, and other characteristics of the masterbatch. Rotors 106 can contain a fluid mechanism or other apparatus that can be temperature controlled to provide heating and/or cooling to the dewatered coagulum as it passes through the compounder 100.

As seen in FIG. 3, each rotor 106 has a first segment 116 and a second segment 118. The portions of the processing chamber that contain the first and second segments, e.g. hopper 104*a* and mixing chamber 104*b*, may be heated or cooled independently. First segment 116 of each rotor can be a feed screw and second segment 118 has a profile selected to provide mastication to the dewatered coagulum. As the dewatered coagulum passes through processing chamber 104, the rotors masticate the material, thereby mixing and drying the dewatered coagulum. Port 109 is provided in processing chamber 104 for the addition of liquid additives. Dry materials can be added to the dewatered coagulum via feed port 102. Vent 111 is provided in processing chamber 104 to allow moisture to vent as the dewatered coagulum dries. The dewatered coagulum exits processing chamber 104 via discharge orifice 114. The temperature of the dewatered coagulum may be controlled by providing appropriate temperature coolant or heating water to the processing chamber 104 or the rotors.

Depending on the elastomer masterbatch composition, the optimal temperature of the hopper 104*a*, mixing chamber 104*b*, and rotors 106 may be different during startup and once the process is fully underway. Control of the operating parameters of continuous compounder 100 allows control of the amount of mechanical energy delivered to the dewatered coagulum and the rate of removal of water. Such operating parameters include throughput rate of the continuous compounder, rotor speed and temperature, discharge orifice size and temperature, power draw, and processing chamber temperature. Similar parameters may be varied for other apparatus that may be used to masticate the dewatered coagulum.

As an option, the dewatered coagulum is masticated using an internal mixer such as a Banbury mixer. The masterbatch crumb may first be brought to a moisture content of about 3 wt % to about 7 wt %, for example, about 5 wt % to about 6 wt %, or about 3 wt % to about 5 wt %. The moisture content may be achieved by dewatering to the desired level or by dewatering the masterbatch crumb to a higher moisture content and then further reducing moisture content by heating the resulting dewatered coagulum, by letting water evaporate from the dewatered coagulum at room temperature, or by other methods familiar to those of skill in the art. The dewatered coagulum may then be masticated in an internal mixer until a desired moisture level or mechanical energy input is achieved. The dewatered coagulum can be masticated until it reaches a predetermined temperature, allowed to cool, and then placed back into the internal mixer one or more times to impart additional energy to the material. Examples of temperatures include from 140° C. to about 165° C., for example, from about 145° C. to about 160° C., or from 150° C. to about 155° C. The dewatered coagulum may be sheeted in a roll mill after each mastication in the internal mixer. Alternatively or in addition, dewatered coagulum that has been masticated in a Banbury mixer may be further masticated in an open mill.

As an option, the dewatering extruder both removes moisture from the masterbatch crumb and masticates the material. As the dewatering extruder is used to remove a higher fraction of the moisture from the masterbatch crumb, it masticates the material. For example, the dewatering extruder may be used to masticate the material while bringing the moisture content to from about 1 wt % to about 3 wt %. This material may then be further masticated on an open mill or other device to reduce the moisture content still further. For example, the dried elastomer composite may have a moisture content of 0.5% by weight or less.

As an option, the masticated coagulum is fed to an open mill. In FIGS. 2 and 3, the masticated coagulum can be discharged from the continuous compounder as a length of extrudate and may be cut into smaller lengths prior to entering open mill 120. The masticated coagulum may optionally be fed to open mill 120 via conveyor 119. Conveyor 119 may be a conveyor belt, conduit, pipe, or other suitable means for transporting the masticated coagulum from continuous compounder 100 to open mill 120. Open mill 120 includes a pair of rollers 122 that may optionally be heated or cooled to provide enhanced operation of open mill 120. Other operating parameters of open mill 120 include the gap distance between the rolls, the bank height, i.e., the reservoir of material in the gap between and on top of the rolls, and the speed of each roll. The speed of each roll and the temperature of the fluid used to cool each roll may be controlled independently for each roll. The gap distance may be from about 5 mm to about 10 mm or from about 6 mm to about 8 mm. The roll speed may be about 15-19 rpm, and the rollers may roll towards one another with respect to the inlet side of the mill. The friction ratio, the ratio of the speed of the collection roller, e.g., the roller on which the masticated coagulum collects, to that of the back roller, may be from about 0.9 to about 1.1. The fluid employed to cool the rollers may be from about 35° C. to about 90° C., for example, from about 45° C. to about 60° C., from about 55° C. to about 75° C., or from about 70° C. to about 80° C. In addition to controlling the operation of the open mill to provide a desired level of mastication and desiccation to the masticated coagulum, it is also desirable that the output of the open mill 120 should collect on the collection roller as a smooth sheet. Without being bound by any particular theory, it is thought that cooler roller temperatures facilitate this goal. Open mill 120 may reduce the temperature of the masticated coagulum to approximately 110-140° C. The residence time of the masticated coagulum in the mill is determined in part by the roller speed, the gap distance and the amount of mastication and drying desired and may be about 10-20 minutes for material that has been masticated in an FCM.

One skilled in the art will recognize that different combinations of devices may be employed to provide mastication and desiccation to wet masterbatch materials. Depending on which devices are used, it may be desirable to operate them under different conditions than those described above to impart varying amounts of work and desiccation to the masterbatch. In addition, it may be desirable to employ more than one of a particular kind of device, e.g., an open mill or internal mixer, in series or to pass masticated coagulum through a given device more than one time. For example, masticated coagulum may be passed through an open mill two or three or more times or passed through two or three or more open mills in series. In the latter case, it may be desirable to operate each open mill under different operating conditions, e.g., speed, temperature, different (e.g. higher) energy input, etc. Masticated coagulum can be passed through one, two, or three open mills after being masticated in an internal mixer.

As an option, the elastomer composite may be used in or produced for use in various parts of a tire, for example, tires, tire treads, tire sidewalls, wire-skim for tires, and cushion gum for retread tires. Alternatively or in addition, elastomer composite may be used for tracks and track pads for track-propelled equipment such as bulldozers, etc., mining equipment such as screens, mining equipment linings, conveyor belts, chute liners, slurry pump liners, mud pump components such as impellers, valve seats, valve bodies, piston hubs, piston rods, and plungers, impellers for various applications such as mixing slurries and slurry pump impellers, grinding mill liners, cyclones and hydrocyclones, and expansion joints, marine equipment such as linings for pumps (e.g., dredge pumps and outboard motor pumps), hoses (e.g., dredging hoses and outboard motor hoses), and other marine equipment, shaft seals for marine, oil, aerospace, and other applications, propeller shafts, linings for piping to convey, e.g., oil sands and/or tar sands, and other applications where abrasion resistance is desired. The vulcanized composite may be used in rollers, cams, shafts, pipes, tread bushings for vehicles, or other applications where abrasion resistance is desired.

Traditional compounding techniques may be used to combine vulcanization agents and other additives known in the art, including the additives discussed above, with the elastomer composite, depending on the desired use.

The present invention further relates to an elastomer composite formed by any one or more methods described herein of the present invention.

The present invention further relates to an elastomer composite containing at least one elastomer, at least one silicon-treated carbon black, at least one coupling agent, and at least one further additive, such as at least one antioxidant. The elastomer can be natural rubber(s) or can be synthetic rubber(s) or can be any combination of both. The silica-containing filler can be present in an amount of from 40 to 60 phr (or other amounts). When cured by heating in a heated press set at 150° C. for a time determined by a conventional rubber rheometer (i.e., T90+10% of T90, where T90 is the time to achieve 90% vulcanization), the elastomer composite can have a tan delta, measured at 60° C., of less than 0.130, such as from about 0.050 to 0.120, from 0.60 to 0.110, or from 0.055 to 0.100. Alternatively or in addition, the elastomer composite can have a T300/T100:tan delta (tan delta measured at 60° C.) ratio of from 47 to 70, for example, from 50 to 65, from 55 to 60, or from 60 to 70.

In the present invention, an elastomer composite can be produced that has a very low tan delta, which is an important characteristic used to determine the performance of an elastomer composite, especially when formed into tires or parts of a tire. The tensile stress of vulcanized samples (T300 and T100) were measured according to ASTM standard D-412. Tan delta 60° was determined using a dynamic strain sweep between 0.01% and 60% at 10 Hz and 60° C. Tan $\delta_{max}$ was taken as the maximum value of tan δ within this range of strains. Rebound was measured according to ASTM standard D7121. The present invention further relates to an elastomer composite having at least one elastomer, at least one silica-containing particulate filler, at least one coupling agent, and at least one further additive, such as at least one antioxidant. The elastomer can be natural rubber(s) or can be synthetic rubber(s) or can be any combination of both. The silica-containing filler can be present in an amount of from 40 to 90 phr (or other amounts). The elastomer composite can have a T300/T100:tan delta (tan delta measured at 60° C.) ratio of from 47 to 70, for example, from 50 to 65, from 55 to 60, or from 60 to 70. The elastomer composite can exhibit a ratio of T300/T100 that is significantly higher, for example, at least 4% higher or from 4% to 15%, for example, from 4% to 7% higher, from 7% to 10% higher, from 10% to 15% higher, or even higher, than for a similar elastomer composite prepared with the further additive, e.g., antioxidant, added before the coupling agent ("comparative elastomer composite") and/or a tan $\delta_{max}$ that is at least 2.5% lower, for example, from 2.5% to 30% lower, for example, from 2.5% to 5% lower, from 5% to 10% lower, from 10% to 15% lower, from 15% to 20% lower, from 20% to 25% lower, from 25% to 30% lower, or even lower, than for the comparative elastomer composite and a ratio of T300/T100:tan $\delta_{max}$ that is significantly higher, for example, at least 4% higher, for example, from 4% to 45% higher, for example, from 4% to 10% higher, from 10% to 20% higher, from 20% to 30% higher, from 30% to 40% higher, from 40% to 45% higher, or even higher, than for the comparative elastomer composite. As an example, the silica-containing filler (e.g., silicon treated carbon black) can have 50 wt % or less silica as part of the silica-containing filler.

In lieu of one or more of the performance properties described immediately above, or in addition to one or more of these properties, the elastomer composites of the present invention can have a free antioxidant level of at least 70% by mass of the antioxidant present in the composite, for example, from 75% to 90%, from 80% to 95%, or from 85% to 99%, wherein these determinations are made for the elastomer composite as produced. The free antioxidant level is measured within 24 hours of addition of the antioxidant to the composite or materials used to produce the composite and, more preferably, within 12 hours of addition or within 6 hours of addition.

The present invention includes the following aspects/embodiments/features in any order and/or in any combination:

1. The present invention relates to a method of producing an elastomer composite, comprising:

feeding a continuous flow of a first fluid comprising elastomer latex to a coagulum reactor;

feeding a continuous flow of a second fluid comprising particulate silica-containing filler under pressure to the coagulum reactor to form a mixture with the elastomer latex, the feeding of the second fluid against the first fluid within the coagulum reactor being sufficiently energetic to coagulate at least a portion of the elastomer latex as the elastomer latex is mixed with the particulate silica-containing filler in the coagulum reactor;

and further comprising introducing at least one coupling agent and introducing at least one further additive, such that the particulate silica-containing filler contacts the coupling agent prior to the silica-containing filler contacting the further additive.

2. The method of any preceding or following embodiment/feature/aspect, wherein the coupling agent is introduced to the second fluid at any point prior to feeding the second fluid to the coagulum reactor.

3. The method of any preceding or following embodiment/feature/aspect, wherein the coupling agent is introduced to the second fluid at any point prior to the coagulum reactor and the further additive is introduced to the first fluid at any point prior to the coagulum reactor.

4. The method of any preceding or following embodiment/feature/aspect, wherein the coupling agent is introduced to the mixture in coagulum reactor.

5. The method of any preceding or following embodiment/feature/aspect, wherein the coupling agent is introduced to the mixture after the mixture exits the coagulum reactor.

6. The method of any preceding or following embodiment/feature/aspect, further comprising conducting one or more processing steps after the elastomer composite exits the coagulum reactor.

7. The method of any preceding or following embodiment/feature/aspect, wherein the processing steps comprise at least one of:

a) dewatering the mixture to obtain a dewatered mixture;
b) mixing or compounding the dewatered mixture to obtain a compounded mixture;
c) milling the compounded mixture to obtain a milled mixture;
d) granulating or mixing the milled mixture;
e) baling the mixture after the granulating or mixing to obtain a baled mixture; and/or
f) optionally breaking apart the baled mixture and mixing.

8. The method of any preceding or following embodiment/feature/aspect, wherein the coupling agent is introduced just prior to and/or during one or more of the steps a) to f).

9. The method of any preceding or following embodiment/feature/aspect, wherein the silica-containing filler is silica-treated carbon black, silica coated carbon black, precipitated silica, fumed silica, or any combinations thereof.

10. The method of any preceding or following embodiment/feature/aspect, wherein the elastomer latex is natural rubber latex, synthetic rubber latex, or combinations thereof 11. The method of any preceding or following embodiment/feature/aspect, wherein the further additive comprises an antioxidant.

12. The method of any preceding or following embodiment/feature/aspect, further comprising discharging a substantially continuous flow of the elastomer composite from the coagulum reactor.

13. The method of any preceding or following embodiment/feature/aspect, wherein the further additive is an antioxidant.

14. The method of any preceding or following embodiment/feature/aspect, wherein the further additive is introduced in the one or more post processing steps.

15. The method of any preceding or following embodiment/feature/aspect, further comprising dry mixing the elastomer composite with additional elastomer to form an elastomer composite blend 16. A method of producing an elastomer composite, comprising:
feeding a continuous flow of first fluid comprising elastomer latex to a coagulum reactor;
feeding a continuous flow of a second fluid comprising particulate silica-containing filler under pressure to the coagulum reactor to form a mixture with the elastomer latex, the feeding of the second fluid against the first fluid within the coagulum reactor being sufficiently energetic to coagulate at least a portion of the elastomer latex as the elastomer latex is mixed with the particulate silica-containing filler in the coagulum reactor;
and further comprising introducing at least one coupling agent and introducing at least one further additive in the method, wherein the coupling agent and the further additive are introduced at about the same time and wherein the elastomer latex is introduced as a single stage addition.

17. The method of any preceding or following embodiment/feature/aspect, wherein the coupling agent and further additive are introduced to the second fluid at any point prior to feeding the second fluid to the coagulum reactor.

18. The method of any preceding or following embodiment/feature/aspect, wherein the coupling agent and further additive are introduced to the first fluid at any point prior to the coagulum reactor.

19. The method of any preceding or following embodiment/feature/aspect, wherein the coupling agent and further additive are introduced to the mixture in the coagulum reactor.

20. The method of any preceding or following embodiment/feature/aspect, wherein the coupling agent and further additive are introduced to the mixture after the mixture exits the coagulum reactor.

21. The method of any preceding or following embodiment/feature/aspect, further comprising conducting one or more processing steps after the elastomer composite exits the coagulum reactor.

22. The method of any preceding or following embodiment/feature/aspect, wherein the processing steps comprise at least one of:
a) dewatering the mixture to obtain a dewatered mixture;
b) mixing or compounding the dewatered mixture to obtain a compounded mixture;
c) milling the compounded mixture to obtain a milled mixture;
d) granulating or mixing the milled mixture;
e) baling the mixture after the granulating or mixing to obtain a baled mixture; and
f) optionally breaking apart the baled mixture and mixing.

23. The method of any preceding or following embodiment/feature/aspect, wherein the coupling agent is introduced just prior to and/or during one or more of the steps a) to f).

24. The method of any preceding or following embodiment/feature/aspect, wherein the silica-containing filler is silica-treated carbon black, silica coated carbon black, precipitated silica, fumed silica, or any combinations thereof.

25. The method of any preceding or following embodiment/feature/aspect, wherein the elastomer latex is natural rubber latex, synthetic rubber latex, or combinations thereof.

26. The method of any preceding or following embodiment/feature/aspect, wherein the further additive comprises an antioxidant.

27. The method of any preceding or following embodiment/feature/aspect, further comprising discharging a substantially continuous flow of the elastomer composite from the coagulum reactor.

28. The method of any preceding or following embodiment/feature/aspect, wherein the further additive is an antioxidant.

29. The method of any preceding or following embodiment/feature/aspect, wherein the further additive is introduced in the one or more post processing steps.

30. The method of any preceding or following embodiment/feature/aspect, further comprising dry mixing the elastomer composite with additional elastomer to form an elastomer composite blend.

31. A method of producing an elastomer composite, comprising:
feeding a continuous flow of first fluid comprising elastomer latex to a coagulum reactor;
feeding a continuous flow of second fluid comprising particulate silica-containing filler under pressure to the coagulum reactor to form a mixture with the elastomer latex, the feeding of the second fluid against the first fluid within the mixing zone being sufficiently energetic to coagulate at least a portion of the elastomer latex as the elastomer latex is mixed with the particulate silica-containing filler in the coagulum reactor;
and further comprising introducing at least one coupling agent and introducing at least one further additive in the method, wherein the coupling agent and the further additive are introduced at about the same time and wherein the elastomer latex is introduced as a multi stage addition.

32. The method of any preceding or following embodiment/feature/aspect, wherein the coupling agent and further additive are introduced to the second fluid at any point prior to feeding the second fluid to the coagulum reactor.

33. The method of any preceding or following embodiment/feature/aspect, wherein the coupling agent and further additive are introduced to the first fluid at any point prior to the coagulum reactor.

34. The method of any preceding or following embodiment/feature/aspect, wherein the coupling agent and further additive are introduced to the mixture in the coagulum reactor.

35. The method of any preceding or following embodiment/feature/aspect, wherein the coupling agent and further additive are introduced to the mixture after the mixture exits the coagulum reactor.

36. The method of any preceding or following embodiment/feature/aspect, further comprising conducting one or more processing steps after the elastomer composite exits the coagulum reactor.

37. The method of any preceding or following embodiment/feature/aspect, wherein the processing steps comprise at least one of:
   a) dewatering the mixture to obtain a dewatered mixture;
   b) mixing or compounding the dewatered mixture to obtain a compounded mixture;
   c) milling the compounded mixture to obtain a milled mixture;
   d) granulating or mixing the milled mixture;
   e) baling the mixture after the granulating or mixing to obtain a baled mixture; and
   f) optionally breaking apart the baled mixture and mixing.

38. The method of any preceding or following embodiment/feature/aspect, wherein the coupling agent is introduced just prior to and/or during one or more of the steps a) to f).

39. The method of any preceding or following embodiment/feature/aspect, wherein the silica-containing filler is silica-treated carbon black, silica coated carbon black, precipitated silica, fumed silica, or any combinations thereof.

40. The method of any preceding or following embodiment/feature/aspect, wherein the elastomer latex is natural rubber latex, synthetic rubber latex, or combinations thereof.

41. The method of any preceding or following embodiment/feature/aspect, wherein the further additive comprises an antioxidant.

42. The method of any preceding or following embodiment/feature/aspect, further comprising discharging a substantially continuous flow of the elastomer composite from the coagulum reactor.

43. The method of any preceding or following embodiment/feature/aspect, wherein the further additive is an antioxidant.

44. The method of any preceding or following embodiment/feature/aspect, wherein the further additive is introduced in the one or more post processing steps.

45. The method of any preceding or following embodiment/feature/aspect, further comprising dry mixing the elastomer composite with additional elastomer to form an elastomer composite blend.

46. The elastomer composite formed by the method of any preceding or following embodiment/feature/aspect.

47. A cured elastomer composite comprising at least one elastomer, at least one silicon-treated carbon black, at least one coupling agent, and at least one further additive, wherein the elastomer is natural rubber, and the silicon-treated carbon black is present in an amount of from about 40 to 60 phr, and wherein, when the cured elastomer composite has a tan delta, measured at 60° C., of less than 0.130.

48. The cured elastomer of any preceding or following embodiment/feature/aspect, wherein said at least one further additive comprises at least one antioxidant.

49. The cured elastomer composite of any preceding or following embodiment/feature/aspect, wherein said silicon-treated carbon black contains 50 wt % or less silica based on the weight of said silicon-treated carbon black.

50. A cured elastomer composite comprising at least one elastomer, at least one silica-containing particulate filler, at least one coupling agent, and at least one further additive, wherein the elastomer is natural rubber, and the silica-containing filler is present in an amount of from about 40 to 90 phr, and wherein the cured elastomer composite has a T300/T100:tan delta (tan delta measured at 60° C.) ratio of 47 to 70.

51. The cured elastomer composite of any preceding or following embodiment/feature/aspect, wherein said at least one further additive comprises at least one antioxidant.

52. The cured elastomer composite of any preceding or following embodiment/feature/aspect, wherein said silica-containing filler contains 50 wt % or less silica, based on the weight of said silica-containing filler.

53. An elastomer composite comprising at least one elastomer, at least one silica-containing particulate filler, at least one coupling agent, and at least one further additive, and the silica-containing particulate filler is present in an amount of from about 10 to 90 phr, and wherein the elastomer composite, as produced, has a free antioxidant level of at least 70% by mass of the antioxidant present in the elastomer composite.

54. The elastomer of any preceding or following embodiment/feature/aspect, wherein said at least one further additive comprises at least one antioxidant.

55. The cured elastomer composite of any preceding or following embodiment/feature/aspect, wherein said silica-containing filler contains 50 wt % or less silica, based on the weight of said silica-containing filler.

56. The method of any preceding or following embodiment/feature/aspect, wherein the post processing steps comprise at least roll milling of the elastomer composite.

57. The method of any preceding or following embodiment/feature/aspect, wherein the roll milling is conducted for a time sufficient to provide at least about 0.7 MJ/kg of specific energy to the elastomer composite.

58. The method of any preceding or following embodiment/feature/aspect, wherein the post processing steps comprise at least roll milling of the elastomer composite.

59. The method of any preceding or following embodiment/feature/aspect, wherein the roll milling is conducted for a time sufficient to provide at least about 0.7 MJ/kg of specific energy to the elastomer composite.

60. The method of any preceding or following embodiment/feature/aspect, wherein the post processing steps comprise at least roll milling of the elastomer composite.

61. The method of any preceding or following embodiment/feature/aspect, wherein the roll milling is conducted for a time sufficient to provide at least about 0.7 MJ/kg of specific energy to the elastomer composite.

The present invention can include any combination of these various features or embodiments above and/or below as set forth in any sentences and/or paragraphs herein. Any combination of disclosed features herein is considered part of the present invention and no limitation is intended with respect to combinable features.

Unless otherwise specified, all material proportions described as a percent herein are in weight percent.

The present invention will be further clarified by the following examples which are intended to be only exemplary in nature.

EXAMPLES

Examples 1-14

In the following theoretical examples (Examples 1-14), coagulated wet masterbatches are produced by impacting a stream of natural rubber latex with a relatively higher velocity stream (75 m/s) of a silica-containing filler slurry (namely, ECOBLACK™ CRX-2125 filler from Cabot Corporation at 12% by weight) in the mixing zone of a coagulum reactor. The coagulated masterbatch crumb, which contains between 70 and 85 wt % water, is then dewatered (DW) to about 10-20 wt % water using a dewatering extruder (French Oil Mill Machinery Company, Piqua, Ohio). In the extruder, the masterbatch crumb is compressed, and water squeezed from the crumb is ejected through a slotted barrel of the extruder. The resulting dewatered coagulum is dropped into a continuous compounder (Farrel Continuous Mixer (FCM), Farrel Corporation) where it is masticated and dried. The moisture content of the resulting masticated masterbatch exiting the FCM is around 1-2 wt %. The masticated masterbatch is further masticated and cooled on an open mill to form a dried elastomer composite. In each example, the coupling agent, bis-(triethoxysilylpropyl)tetrasulfide (TESPT, Si-69, available from Evonik Industries, Essen, Germany), ("Si-69") is added at a concentration of about 2.0% of the weight of filler and an antioxidant, either N-(1,3-dimethylbutyl)-N'-phenyl-p-phenylenediamine (6PPD, Flexsys, St. Louis, Mo.) ("6PPD", all examples except 1, 1a, 12a, and Comparative Example B) or 2,2,4-trimethyl-1,2-dihydroquinone (TMQ; Examples 12a and Comparative Example B: Agerite Resin D, R. T. Vanderbilt; Examples 1 and 1a: Aquanox TMQ dispersion, Aquaspersions) is added at a concentration of about 1.0% of the weight of rubber (phr). The position (location and order) in which these two chemicals are added in the process is given for each example in Table 3 below. In Table 3, "Banbury" indicates that, about 24 hours after the masticated masterbatch emerges from the roll mill, the antioxidant is mixed with the dried elastomer composite at a concentration of 1.0% of the weight of rubber (phr) using a Banbury mixer. The mixing time is about 1 minute. In one version of each example, the residence time on the roll mill is such that the composite experiences about 0.7 MJ/kg of specific energy. In another version, the residence time is doubled such that the specific energy is about 1.4 MJ/kg.

Dried elastomer composite is compounded and vulcanized in preparation for mechanical testing. Dried elastomer composite is mixed in a Banbury mixer using the formulation given in Table 1 and the compounding procedure given in Table 2, below. Vulcanization is carried out in a heated press set at 150° C. for a time determined by a conventional rubber rheometer (i.e., T90+10% of T90, where T90 is the time to achieve 90% vulcanization).

Predicted rubber performance test results are set forth below in Table 3. The tensile stress of vulcanized samples (T300 and T100) is measured according to ASTM standard D-412. Dynamic mechanical properties are determined using a dynamic strain sweep between 0.01% and 60% at 10 Hz and 60° C. Tan $\delta_{max}$ is taken as the maximum value of tan $\delta$ within this range of strains. A '+' indicates that the ratio of T300/T100 is significantly higher than Comparative Example A and/or that the tan $\delta_{max}$ is significantly lower than the comparative example and that the ratio of T300/T100:tan $\delta_{max}$ is higher than the comparative example. A '++' in Table 3 indicates a larger improvement in the same properties, and a '+++' indicates the largest improvement in properties.

Example 15

A wet masterbatch was produced by impacting a stream of natural rubber latex with a relatively higher velocity stream (75 m/s) of a silica-containing filler slurry (namely, ECOBLACK™ CRX-2125 filler from Cabot Corporation at 12% by weight). The coagulated masterbatch crumb, which contained about 80 wt % water, was then dewatered (DW) to about 15 wt % water using a dewatering extruder (French Oil Mill Machinery Company, Piqua, Ohio). In the extruder, the masterbatch crumb was compressed, and water squeezed from the crumb was ejected through a slotted barrel of the extruder. The resulting dewatered coagulum was dropped into a continuous compounder (Farrel Continuous Mixer (FCM), Farrel Corporation) for mastication and drying. An antioxidant, 6PPD, was added to the FCM at a rate such that the resulting concentration in the resulting masticated masterbatch was 1.0 phr. The moisture content of the masticated masterbatch exiting the FCM was around 1-2%. The masticated masterbatch was further masticated and cooled on an open mill for a time sufficient to provide about 0.7 MJ/kg of specific energy to the masterbatch, forming a dried elastomer composite. The dried elastomer composite was cooled and stored at ambient temperature. Dried elastomer composite was compounded in a Banbury mixer using the same formulation as in Table 1, except that the coupling agent Si-69 was added at a concentration of 2% by weight of filler, and 2.5 phr of Calight RPO oil (R.E. Carroll, Inc., Trenton, N.J.) was also added. The compounding procedure given in Table 2 was followed. Vulcanization was carried out in a heated press set at 150° C. for a time determined by a conventional rubber rheometer (i.e., T90+10% of T90, where T90 is the time to achieve 90% vulcanization). Rubber performance test results are given in Table 4.

Example 16

A wet masterbatch was produced by impacting a stream of natural rubber latex with a relatively higher velocity stream (75 m/s) of a silica-containing filler slurry (namely, ECOBLACK™ CRX-2125 filler from Cabot Corporation at a concentration of 12 wt %) in the mixing zone of a coagulum reactor. The coagulated masterbatch crumb, which contained about 80 wt % water, was then dewatered (DW) to about 15 wt % water using a dewatering extruder (French Oil Mill Machinery Company, Piqua, Ohio). In the extruder, the masterbatch crumb was compressed, and water squeezed from the crumb was ejected through a slotted barrel of the extruder. The resulting dewatered coagulum was dropped into a continuous compounder for mastication and drying (Farrel Continuous Mixer (FCM), Farrel Corporation). A coupling agent, Si-69, was added to the FCM at a rate such that the concentration in the resulting masticated masterbatch was about 2% of the filler weight. The moisture content of the masticated masterbatch exiting the FCM was around 1-2%. The masticated masterbatch was further masticated and cooled on an open mill for a time sufficient to provide about 1.4 MJ/kg of specific energy to the masterbatch, forming a dried elastomer composite. The dried elastomer composite was cooled and stored at ambient temperature. About 24 hours after the masticated masterbatch emerged from the roll mill, an antioxidant, 6PPD, was mixed with the dried elastomer composite at a concentration of 1.0% of the weight of rubber (phr) using a Banbury mixer. The mixing time was about 1 minute. The resulting masterbatch was compounded in a Banbury mixer using the formulation given in Table 1, except that 2.5 phr of Calight RPO oil (R.E. Carroll, Inc., Trenton, N.J.) was added along with the other additives, and the compounding procedure given in Table 2. Vulcanization was carried out in a heated press set at 150° C. for a time determined by a conventional rubber rheometer (i.e., T90+10% of T90, where T90 is the time to achieve 90% vulcanization). Rubber performance test results are given in Table 4.

TABLE 1

| Ingredient | Parts by weight |
|---|---|
| Masterbatch | Sufficient to give 100 parts of rubber |
| 6PPD (antioxidant) | 0.5 |
| ZnO | 5.0 |
| Stearic acid | 3.0 |
| Agerite resin D | 1.5 |
| Sunproof Improved | 1.5 |
| TBBS | 1.4 |
| Sulfur | 1.2 |

TABLE 2

| | Stage 1 | Stage 2 |
|---|---|---|
| Fill factor | 0.75 | 0.65 |
| Rotor Speed | 70 rpm | 60 rpm |
| Ram pressure | 2.8 bar | 2.8 bar |
| Cooling water temperature | 50° C. | 50° C. |
| Mixing Sequence | Time 0-add masterbatch 0.5 min-add smalls 2 min-dump | Time 0-add product of stage 1 and curatives 1 min-dump |
| Open Mill | Four crosscuts and two end rolls | Four crosscuts and two end rolls; sheet off to required thickness for testing |

TABLE 3

| Example Number | Position of Si-69 addition | Position of 6-PPD addition | Rubber performance with 0.7 MJ/kg roll mill energy | Rubber performance with 1.4 MJ/kg roll mill energy |
|---|---|---|---|---|
| 1 * | Slurry | Slurry | + | ++ |
| 1a * (Comparative) | Slurry | Slurry | | |
| 2 | Slurry | Latex | ++ | +++ |
| 3 | Slurry | FCM | ++ | +++ |
| 4 | Slurry | Roll mill | ++ | +++ |
| 5 | Slurry | Banbury | ++ | +++ |
| 6 | Mixing Block | Mixing Block | + | ++ |
| 7 | Mixing Block | FCM | ++ | +++ |
| 8 | Mixing Block | Roll mill | ++ | +++ |
| 9 | Mixing Block | Banbury | ++ | +++ |
| 10 | FCM | FCM | + | ++ |
| 11 | FCM | Roll mill | ++ | +++ |
| 12 | FCM | Banbury | ++ | +++ |
| 12a | FCM | Banbury | ++ | +++ |
| 13 | Roll mill | Roll mill | + | ++ |
| 14 | Roll mill | Banbury | ++ | +++ |
| Comparative A | During compounding | FCM | N/A | N/A |
| Comparative B | During compounding | FCM | N/A | N/A |

* Example 1 is a simultaneous addition of Si-69 and Aquanox TMQ dispersion in the slurry and Example 1a is a sequential addition-Aquanox TMQ dispersion first and then Si-69 second in the slurry.

TABLE 4

| | Example 16 | Example 15 (comparative) |
|---|---|---|
| T100 (MPa) | 2.63 | 2.59 |
| T300 (MPa) | 17.04 | 15.62 |
| T300/T100 | 6.48 | 6.03 |
| Tan $\delta_{max}$ | 0.097 | 0.130 |

Example 17

Adsorption of 6PPD on Particulate Filler

A mixture of 75 g silicon-treated carbon black (ECOBLACK CRX 2125 filler, Cabot Corporation), 200 g water, and 500 g ethanol was prepared and stirred at room temperature. The pH was adjusted to 9.4 with ammonium hydroxide solution, following which 1.86 g bis-(triethoxysilylpropyl) tetrasulfide (TESPT, Si-69, available from Evonik Industries, Essen, Germany) was added to the mixture. The mixture was heated to 60° C., stirred for 30 minutes at 60° C., and cooled. Half the material was dried with a rotary evaporator ("CRX 2125/Si69"). The remainder was filtered, washed three times with ethanol, and dried ("CRX 2125/Si69 wash").

Adsorption of N-(1,3-dimethylbutyl)-N'-phenyl-p-phenylenediamine (6PPD, Flexsys, St. Louis, Mo.) was measured for four materials: N234 carbon black (Vulcan 7H carbon black, Cabot Corporation), the two Si-69 treated silicon-treated carbon blacks described above, and CRX 2125 silicon-treated carbon black that had not been treated with Si-69. Samples were prepared with 2 g filler, 10 g squalene (Sigma Aldrich), and varying amounts of 6PPD. For N234 carbon black, samples were prepared with 0.02 g, 0.05 g, and 0.10 g of 6PPD. For the silicon-treated carbon blacks, samples were prepared with 0.01 g, 0.02 g, 0.05 g, and 0.10 g of 6PPD. The samples were shaken overnight at room temperature and then centrifuged. The supernatant was analyzed for 6PPD content by nuclear magnetic resonance spectroscopy (NMR). The adsorbed amount of 6PPD ("A") per amount of filler given as weight percent is $$A=(100X_o-X)*(W_s+Y)/W_f$$

where
Ws is the weight of the squalene,
$W_f$ is the weight of the filler,
$X_o$ is the ratio of the total weight of 6PPD in the sample with respect to the sum of the weight of squalene and the total weight of 6PPD in the sample,
X is the amount of 6PPD in the supernatant, expressed as weight percent, and
Y is the total weight of 6PPD in the sample.

Figure 4:
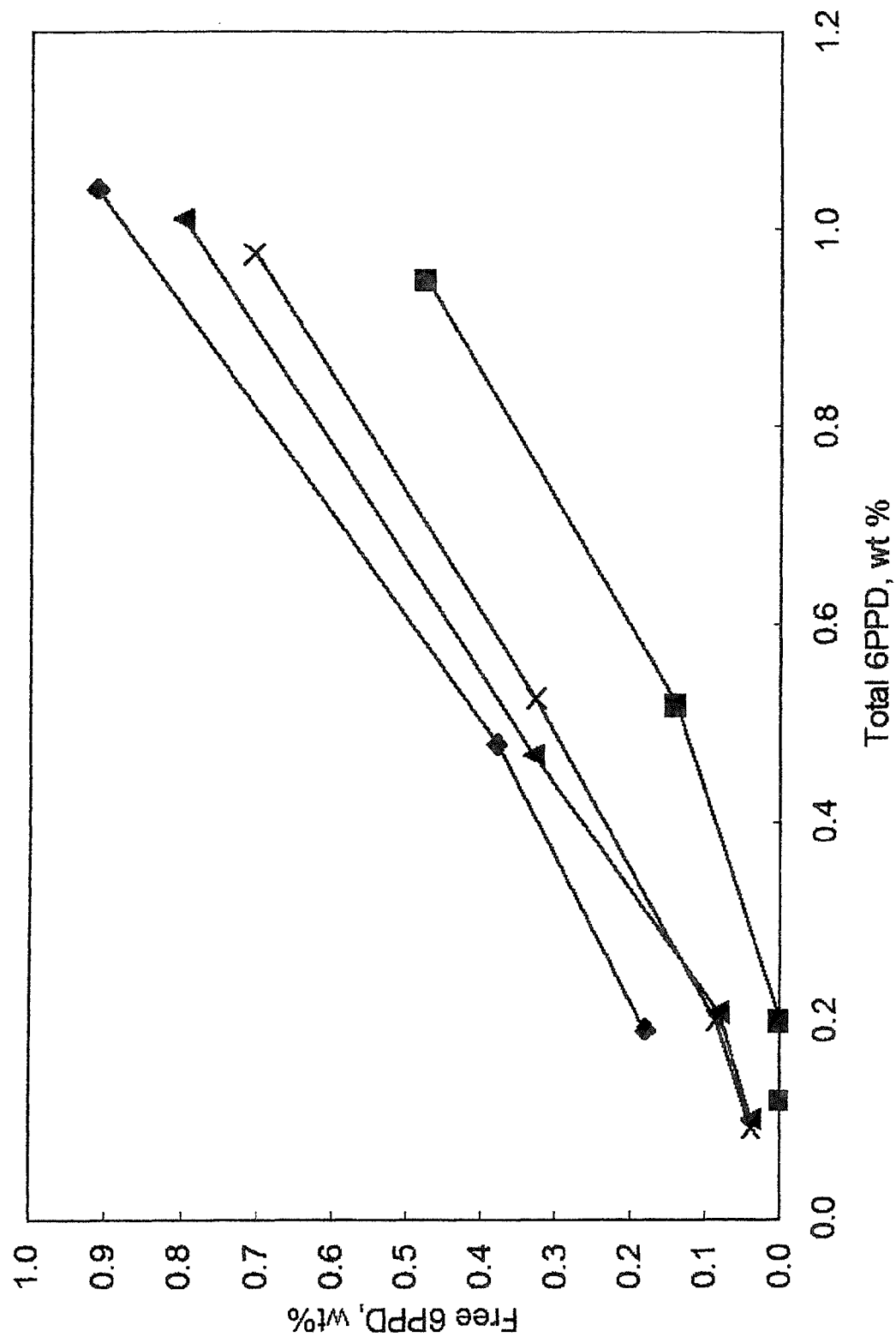
FIG. 4 is a graph depicting model interactions of silicon-treated carbon black or carbon black with coupling agent and antioxidant additives.

The weight percent of 6PPD in the supernatant with respect to the total of 6PPD and squalene in the supernatant (i.e., free 6PPD) is plotted with respect to total 6PPD as a weight percent of the 6PPD and squalene in the supernatant in FIG. 4. In FIG. 4, the □ is N234 carbon black (i.e., VULCAN 7H), the ◇ is silicon-modified carbon black with antioxidant only (i.e., CRX 2125 filler with 6PPD), the X is silicon-modified carbon black pre-treated with coupling agent (i.e., CRX 2125 filler pre-treated with Si 69), and the Δ is silicon-modified carbon black pre-treated with coupling agent and washed (i.e., CRX 2125 filler pre-treated with Si 69 and washed).

The results show that the antioxidant molecule has a much stronger affinity for the silica containing filler compared to an equivalent carbon black surface. The curve shown for V7H carbon black (N234) is highest among the fillers, indicating that the least amount of antioxidant was attached to the filler and hence the maximum remained in the squalene polymer phase. This indicates that the antioxidant has the weakest affinity for a carbon black with respect to silicon-treated carbon black or silicon-treated carbon black treated with Si-69 coupling agent. Antioxidant shows the strongest affinity for untreated silicon-treated carbon black particles. This suggests that the antioxidant may occupy the active silica sites on the filler surface and remain bonded to the filler instead of being present in the polymer phase to trap free radicals. According to these findings, an additional disadvantage would be present in elastomer composites incorporating such silica containing fillers because competition with the antioxidant at the silica sites on the filler surface reduces the amount of coupling agent that is attached to the filler surface, which is necessary for a strong interaction between the silica sites on the filler and the polymer.

Example 18

Adsorption of Antioxidant (6PPD) on Particulate Silica Filler

A mixture of 75 g precipitated silica (ZEOSIL 1165 filler, Rhodia Silica), 200 g water, and 500 g ethanol was prepared and stirred at room temperature. The pH was adjusted to 9.4 with ammonium hydroxide solution, following which 6 g bis-(triethoxysilylpropyl)tetrasulfide (TESPT, Si-69, available from Evonik Industries, Essen, Germany) was added to the mixture. The mixture was heated to 60° C., stirred overnight at 60° C., and cooled. Half the material was dried with a rotary evaporator ("Silica/Si69"). The remainder was filtered, washed three times with ethanol, and dried ("Silica/Si69 wash").

Adsorption of N-(1,3-dimethylbutyl)-N'-phenyl-p-phenylenediamine (6PPD, Flexsys, St. Louis, Mo.) was measured for four materials: untreated silica (A), the two Si-69 treated silicas described above (B—rotovapped, C—filtered and washed), and a 50/50 (mass basis) mixture of N234 carbon black (Vulcan 7H carbon black, Cabot Corporation) with the three silicas described above (D, E, and F, respectively). Samples were prepared with 2 g filler, 10 g squalene (Sigma Aldrich), and 0.01 g, 0.02 g, 0.05 g, or 0.10 g of 6PPD. The samples were shaken overnight at room temperature and then centrifuged. The supernatant was analyzed for 6PPD content by nuclear magnetic resonance spectroscopy (NMR). The adsorbed amount of 6PPD per amount of filler given as weight percent is as described in Example 17.

Figure 5:
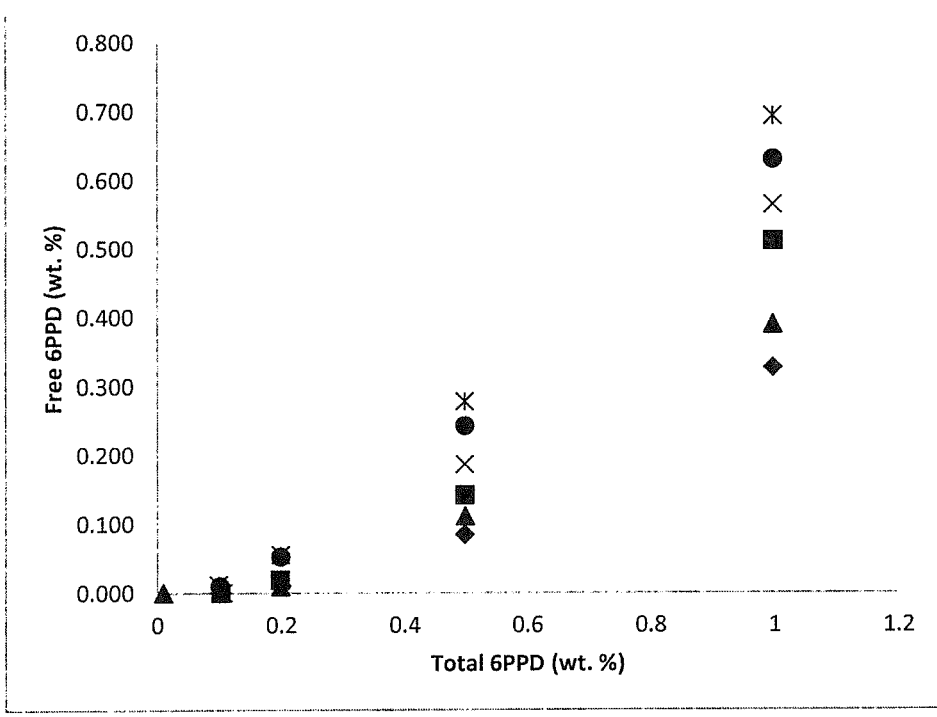
FIG. 5 is a graph depicting model interactions of silica filler with coupling agent and antioxidant additives.

The weight percent of 6PPD in the supernatant with respect to the total of 6PPD and squalene in the supernatant (i.e, free 6PPD) is plotted with respect to total 6PPD as a weight percent of the 6PPD and squalene in the supernatant in FIG. 5 (A—diamond; B—square; C—triangle; D—X, E—Ж, F—circle). The results are consistent with the results in Example 17 for silica-treated carbon black. The amount of 6PPD adsorbed onto the filler is higher (i.e., lower free 6PPD) for the neat silica samples than for the silica/carbon black mixtures, consistent with the observation that less antioxidant was adsorbed onto carbon black than onto silica-treated carbon black. Furthermore, the antioxidant showed the strongest affinity for untreated silica, whether in a mixture with carbon black or on its own. The results show that, for both silica-treated carbon black and mixtures of silica and carbon black, contacting the silica-containing filler with coupling agent prior to contacting it with the antioxidant can improve the interaction between the silica and the polymer by improving the proportion of coupling agent in the composite that is bound to the silica and the proportion of antioxidant that is free in the polymer phase.

Examples 19-32

In the following theoretical examples (Examples 19-32), coagulated wet masterbatches are produced by impacting a stream of natural rubber latex with a relatively higher velocity stream (75 m/s) of a silica filler slurry (namely, precipitated silica-ZEOSIL 1165 filler, Rhodia Silica at 12% by weight) in the mixing zone of a coagulum reactor. A stream of 10% acetic acid (by volume) is also pumped into the mixing zone at a sufficient rate for the coagulated masterbatch crumb to have a pH of about 4. The coagulated masterbatch crumb, which contains between 70 and 85 wt % water, is then dewatered (DW) to about 10-20 wt % water using a dewatering extruder (French Oil Mill Machinery Company, Piqua, Ohio). In the extruder, the masterbatch crumb is compressed, and water squeezed from the crumb is ejected through a slotted barrel of the extruder. The resulting dewatered coagulum is dropped into a continuous compounder (Farrel Continuous Mixer (FCM), Farrel Corporation) where it is masticated and dried. The moisture content of the resulting masticated masterbatch exiting the FCM is around 1-2 wt %. The masticated masterbatch is further masticated and cooled on an open mill to form a dried elastomer composite. In each example, the coupling agent, bis-(triethoxysilylpropyl)tetrasulfide (TESPT, Si-69, available from Evonik Industries, Essen, Germany), ("Si-69") is added at a concentration of about 2.0% of the weight of filler and, except as indicated, the antioxidant N-(1,3-dimethylbutyl)-N'-phenyl-p-phenylenediamine (6PPD, Flexsys, St. Louis, Mo.) ("6PPD") is added at a concentration of about 1.0% of the weight of rubber (phr). For Example 30a, Aquanox TMQ dispersion from Aquaspersions (Halifax, UK) is used at a concentration of about 1.0 phr of TMQ. The position (location and order) in which these two chemicals are added in the process is given for each example in Table 5 below. In Table 5, "Banbury" indicates that, about 24 hours after the masticated masterbatch emerges from the roll mill, the antioxidant is mixed with the dried elastomer composite at a concentration of 1.0% of the weight of rubber (phr) using a Banbury mixer. The mixing time is about 1 minute. In one version of each example, the residence time on the roll mill is such that the composite experiences about 0.7 MJ/kg of specific energy. In another version, the residence time is doubled such that the specific energy is about 1.4 MJ/kg.

Dried elastomer composite is compounded and vulcanized in preparation for mechanical testing. Dried elastomer composite is mixed in a Banbury mixer using the formulation given in Table 1 and the compounding procedure given in Table 2, above. Vulcanization is carried out in a heated press set at 150° C. for a time determined by a conventional rubber rheometer (i.e., T90+10% of T90, where T90 is the time to achieve 90% vulcanization).

Predicted rubber performance test results are set forth below in Table 5. The tensile stress of vulcanized samples (T300 and T100) is measured according to ASTM standard D-412. Dynamic mechanical properties are determined using a dynamic strain sweep between 0.01% and 60% at 10 Hz and 60° C. Tan $\delta_{max}$ is taken as the maximum value of tan δ within this range of strains. A '+' indicates that the ratio of T300/T100 is significantly higher than a theoretical comparative example that would be the same as Comparative Example A, but where silica was used, and/or that the tan $\delta_{max}$ is significantly lower than this comparative example and that the ratio of T300/T100:tan $\delta_{max}$ is higher than the comparative example. A '++' in Table 5 indicates a larger improvement in the same properties, and a '+++' indicates the largest improvement in properties.

TABLE 5

| Example Number | Position of Si-69 addition | Position of 6-PPD addition | Rubber performance with 0.7 MJ/kg roll mill energy | Rubber performance with 1.4 MJ/kg roll mill energy |
|---|---|---|---|---|
| 19 * | Slurry | Slurry | + | ++ |
| 19a * (Comparative) | Slurry | Slurry | | |
| 20 | Slurry | Latex | ++ | +++ |
| 21 | Slurry | FCM | ++ | +++ |
| 22 | Slurry | Roll mill | ++ | +++ |
| 23 | Slurry | Banbury | ++ | +++ |
| 24 | Mixing Block | Mixing Block | + | ++ |
| 25 | Mixing Block | FCM | ++ | +++ |
| 26 | Mixing Block | Roll mill | ++ | +++ |
| 27 | Mixing Block | Banbury | ++ | +++ |
| 28 | FCM | FCM | + | ++ |
| 29 | FCM | Roll mill | ++ | +++ |
| 30 | FCM | Banbury | ++ | +++ |
| 30a | FCM | Banbury | ++ | +++ |
| 31 | Roll mill | Roll mill | + | ++ |
| 32 | Roll mill | Banbury | ++ | +++ |

* Example 19 is a simultaneous addition of Si-69 and Aquanox TQM dispersion in the slurry and Example 19a is a sequential addition-Aquanox TQM dispersion first and then Si-69 second in the slurry; in both cases the final concentration of antioxidant is about 1 phr.

Examples 33-45

In the following examples (Examples 34-43), coagulated wet masterbatches were produced by impacting a stream of natural rubber latex with a relatively higher velocity stream (75 m/s) of a silica-containing filler slurry (namely, ECO-BLACK™ CRX-2125 filler from Cabot Corporation) in the mixing zone of a coagulum reactor. The coagulated masterbatch crumb contained between 70 and 85 wt % water, was then dewatered (DW) to about 10-20 wt % water using a dewatering extruder (French Oil Mill Machinery Company, Piqua, Ohio). In the extruder, the masterbatch crumb was compressed, and water squeezed from the crumb was ejected through a slotted barrel of the extruder. The resulting dewatered coagulum was dropped into a continuous compounder (Farrel Continuous Mixer (FCM), Farrel Corporation) where it was masticated and dried. The moisture content of the resulting masticated masterbatch exiting the FCM was around 1-2 wt %. The masticated masterbatch was further masticated and cooled on an open mill to form a dried elastomer composite. The coupling agent, bis-(triethoxysilylpropyl)tetrasulfide (TESPT, Si-69, available from Evonik Industries, Essen, Germany), ("Si-69") was added at a concentration of about 2.0% of the weight of filler and the antioxidant N-(1,3-dimethylbutyl)-N'-phenyl-p-phenylenediamine (6PPD, Flexsys, St. Louis, Mo.) ("6PPD") was added at the indicated concentration based weight of rubber (phr). The position (location and order) in which these two chemicals are added in the process is given for each example in Table 7 below. In Table 7, "Banbury" indicates that, about 24 hours after the masticated masterbatch emerged from the roll mill, the antioxidant was mixed with the dried elastomer composite at a concentration of 1.0% of the weight of rubber (phr) using a Banbury mixer. The mixing time was about 1 minute. In examples 33-38 and 41-44, the residence time on the roll mill was such that the composite experiences about 0.7 MJ/kg of specific energy. In examples 39 and 40, the residence time was doubled such that the specific energy was about 1.4 MJ/kg.

Example 33 in Table 7 is a comparative example, wherein no coupling agent was added during the wet masterbatch process. Rather, coupling agent was added during the compounding stage as indicated in Table 7. Examples 44 and 45 are also comparative, wherein a dry mix masterbatch (i.e., a mixture of coagulated natural rubber and dry filler) was used instead of a wet masterbatch. Examples 44 and 45 used the same ingredients with regard to coupling agent, rubber, and antioxidant as in Table 1, except the mix was a dry mix and filler was present at 51 phr. The mixing and compounding procedure is set out in Table 6 below.

TABLE 6

| | Stage 1 | Stage 2 | Stage 3 |
|---|---|---|---|
| Fill factor | 0.75 | 0.75 | 0.65 |
| Rotor Speed | 80 rpm | 80 rpm | 60 rpm |
| Ram pressure | 2.8 bar | 2.8 bar | 2.8 bar |
| Cooling water temperature | 50° C. | 50° C. | 50° C. |
| Mixing Sequence | Time 0-add rubber 0.5 min-add ⅔ of filler and add Si-69 1 min-add remaining filler 150° C.-dump | Time 0-add product of stage 1 0.5 min-add smalls 2 min-dump | Time 0-add product of stage 2 and curatives 1 min-dump |
| Open Mill | Four crosscuts and two end rolls | Four crosscuts and two end rolls | Four crosscuts and two end rolls; sheet off to required thickness for testing |

Dried elastomer composite was compounded and vulcanized in preparation for mechanical testing. Dried elastomer composite for Examples 33-43 was mixed in a Banbury mixer using the formulation given in Table 1 and the compounding procedure given in Table 2. Dry mixed composites for Examples 44 and 45 was used as compounded. Vulcanization was carried out in a heated press set at 150° C. for a time determined by a conventional rubber rheometer (i.e., T90+ 10% of T90, where T90 is the time to achieve 90% vulcanization).

Rubber performance test results are set forth below in Table 7. The tensile stress of vulcanized samples (T300 and T100) was measured according to ASTM standard D-412. Dynamic mechanical properties were determined using a dynamic strain sweep between 0.01% and 60% at 10 Hz and 60° C. Tan $\delta_{max}$ was taken as the maximum value of tan $\delta$ within this range of strains.

TABLE 7

| Example | 33* | 34 | 35 | 36 | 37 | 38 | 39 | 40 |
|---|---|---|---|---|---|---|---|---|
| Si69 Addition during wet masterbatch | No | FCM | FCM | FCM | FCM | FCM | FCM | FCM |
| 6-PPD addition during wet masterbatch | FCM | Banbury | No | Banbury | Banbury | Banbury | No | FCM |
| 6-PPD added in wet masterbatch (phr) | 1 | 1 | 0 | 1 | 2 | 1 | 0 | 1 |
| 6-PPD to be added during compounding | 0.5 | 0.5 | 1.5 | 0.5 | 0.5 | 0.5 | 1.5 | 0.5 |
| Si69 to be added during compounding (parts % filler) | 2 | 0 | 0 | 1 | 0 | 0 | 0 | 0 |
| Mixing notes | Wet Masterbatch without Si69 | | | | Wet Masterbatch Si69 in FCM | | | |
| Additional notes | Si69 added during compounding | | | | | Extra roll-milling | Extra roll-milling | |
| 100% mod. (MPa) | 3.06 | 2.75 | 2.75 | 2.71 | 2.78 | 3.01 | 2.58 | 2.85 |
| 300% mod. (MPa) | 18.02 | 16.59 | 17.05 | 16.23 | 16.97 | 18.72 | 16.62 | 17.2 |
| M300/M100 | 5.89 | 6.03 | 6.20 | 5.99 | 6.10 | 6.22 | 6.44 | 6.04 |
| Rebound (%) | 60.5 | 61.6 | 62.6 | 61.0 | 60.8 | 63.2 | 62.8 | 62.9 |
| max tan delta 60 C. | 0.140 | 0.131 | 0.128 | 0.131 | 0.134 | 0.109 | 0.122 | 0.118 |
| Ecoblack Loading from TGA (phr) | 51.9 | 50.0 | 50.0 | 50.0 | 51.0 | 50.9 | 50.9 | 49.4 |

| Example | 41 | 42 | 43 | 44* | 45* |
|---|---|---|---|---|---|
| Si69 Addition during wet masterbatch | Slurry | Slurry | Slurry | n/a | n/a |
| 6-PPD addition during wet masterbatch | Banbury | No | Banbury | n/a | n/a |
| 6-PPD added in wet masterbatch (phr) | 1 | 0 | 1 | n/a | n/a |
| 6-PPD to be added during compounding | 0.5 | 1.5 | 0.5 | n/a | n/a |
| Si69 to be added during compounding (parts % filler) | 0 | 0 | 1 | n/a | n/a |
| Mixing notes | | Wet Masterbatch Si69 in slurry | | Dry mix | |
| Additional notes | | | | | |
| 100% mod. (MPa) | 2.89 | 2.94 | 3.11 | 3.05 | 3.4 |
| 300% mod. (MPa) | 17.72 | 17.57 | 18.27 | 16.29 | 17.36 |
| M300/M100 | 6.13 | 5.98 | 5.87 | 5.34 | 5.11 |
| Rebound (%) | 60.4 | 61.6 | 61.2 | 59.2 | 58.1 |
| max tan delta 60 C. | 0.141 | 0.136 | 0.124 | 0.126 | 0.126 |
| Ecoblack Loading from TGA (phr) | 52.7 | 52.7 | 52.7 | 51.4 | 52.2 |

*Comparative Examples

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method of producing an elastomer composite, comprising:

feeding a continuous flow of a first fluid comprising elastomer latex to a mixing zone of a coagulum reactor;

feeding a continuous flow of a second fluid comprising particulate silica-containing filler under pressure to the mixing zone of the coagulum reactor to form a mixture with the elastomer latex, the feeding of the second fluid against the first fluid within the coagulum reactor being sufficiently energetic to coagulate at least a portion of the elastomer latex as the elastomer latex is mixed with the particulate silica-containing filler in the coagulum reactor;

and further comprising introducing at least one coupling agent and introducing at least one amine-type antioxidant, such that the particulate silica-containing filler contacts the coupling agent prior to the silica-containing filler contacting the amine-type antioxidant, and wherein the coupling agent is introduced in the mixing zone or after the mixture exits the mixing zone.

2. A method of producing an elastomer composite, comprising:
- feeding a continuous flow of a first fluid comprising elastomer latex to a coagulum reactor;
- feeding a continuous flow of a second fluid comprising particulate filler selected from silicon-treated carbon black, silica coated carbon black, or a mixture of both under pressure to the coagulum reactor to form a mixture with the elastomer latex, the feeding of the second fluid against the first fluid within the coagulum reactor being sufficiently energetic to coagulate at least a portion of the elastomer latex as the elastomer latex is mixed with the particulate silica-containing filler in the coagulum reactor;
- and further comprising introducing at least one coupling agent and introducing at least one amine-type antioxidant, such that the particulate filler contacts the coupling agent prior to the particulate filler contacting the amine-type antioxidant.

3. The method of claim 2, wherein the coupling agent is introduced to the second fluid at any point prior to feeding the second fluid to the coagulum reactor.

4. The method of claim 2, wherein the coupling agent is introduced to the second fluid at any point prior to the coagulum reactor and the amine-type antioxidant is introduced to the first fluid at any point prior to the coagulum reactor.

5. The method of claim 1, wherein the coupling agent is introduced to the mixture in coagulum reactor.

6. The method of claim 1, wherein the coupling agent is introduced to the mixture after the mixture exits the coagulum reactor.

7. The method of claim 1, further comprising conducting one or more processing steps after the elastomer composite exits the coagulum reactor.

8. The method of claim 7, wherein the processing steps comprise at least one of:
a) dewatering the mixture to obtain a dewatered mixture;
b) mixing or compounding the dewatered mixture to obtain a compounded mixture;
c) milling the compounded mixture to obtain a milled mixture;
d) granulating or mixing the milled mixture;
e) baling the mixture after the granulating or mixing to obtain a baled mixture; and
f) optionally breaking apart the baled mixture and mixing.

9. The method of claim 8, wherein the coupling agent is introduced just prior to and/or during one or more of the steps a) to f).

10. The method of claim 1, wherein the silica-containing filler is silicon-treated carbon black, silica coated carbon black, precipitated silica, fumed silica, or any combinations thereof.

11. The method of claim 1, wherein the amine-type antioxidant comprises N-(1,3-dimethylbutyl)-N-phenyl-p-phenylenediamine.

12. The method of claim 1, further comprising discharging a substantially continuous flow of the elastomer composite from the coagulum reactor.

13. The method of claim 7, wherein the amine-type antioxidant is introduced in the one or more post processing steps.

14. The method of claim 1, further comprising dry mixing the elastomer composite with additional elastomer to form an elastomer composite blend.

15. A method of producing an elastomer composite, comprising:
- feeding a continuous flow of first fluid comprising elastomer latex to a coagulum reactor;
- feeding a continuous flow of a second fluid comprising particulate silica-containing filler under pressure to the coagulum reactor to form a mixture with the elastomer latex, the feeding of the second fluid against the first fluid within the coagulum reactor being sufficiently energetic to coagulate at least a portion of the elastomer latex as the elastomer latex is mixed with the particulate silica-containing filler in the coagulum reactor;
- and further comprising introducing at least one coupling agent and introducing at least one amine-type antioxidant in the method, wherein the coupling agent and the amine-type antioxidant are introduced at about the same time and wherein the elastomer latex is introduced as a single stage addition or a multi-stage addition.

16. The method of claim 15, wherein the coupling agent and amine-type antioxidant are introduced to the second fluid at any point prior to feeding the second fluid to the coagulum reactor.

17. The method of claim 15, wherein the coupling agent and amine-type antioxidant are introduced to the first fluid at any point prior to the coagulum reactor.

18. The method of claim 15, wherein the coupling agent and amine-type antioxidant are introduced to the mixture in the coagulum reactor.

19. The method of claim 15, wherein the coupling agent and amine-type antioxidant are introduced to the mixture after the mixture exits the coagulum reactor.

20. The method of claim 15, further comprising conducting one or more processing steps after the elastomer composite exits the coagulum reactor.

21. The method of claim 20, wherein the processing steps comprise at least one of:
a) dewatering the mixture to obtain a dewatered mixture;
b) mixing or compounding the dewatered mixture to obtain a compounded mixture;
c) milling the compounded mixture to obtain a milled mixture;
d) granulating or mixing the milled mixture;
e) baling the mixture after the granulating or mixing to obtain a baled mixture; and
f) optionally breaking apart the baled mixture and mixing.

22. The method of claim 21, wherein the coupling agent is introduced just prior to and/or during one or more of the steps a) to f).

23. The method of claim 15, wherein the silica-containing filler is silicon-treated carbon black, silica coated carbon black, precipitated silica, fumed silica, or any combinations thereof.

24. The method of claim 15, wherein the amine-type antioxidant comprises N-(1,3-dimethylbutyl)-N-phenyl-p-phenylenediamine.

25. The method of claim 15, further comprising discharging a substantially continuous flow of the elastomer composite from the coagulum reactor.

26. The method of claim 20, wherein the amine-type antioxidant is introduced in the one or more post processing steps.

27. The method of claim 15, further comprising dry mixing the elastomer composite with additional elastomer to form an elastomer composite blend.

28. The method of claim 7, wherein the post processing steps comprise at least roll milling of the elastomer composite for a time sufficient to provide at least about 0.7 MJ/kg of specific energy to the elastomer composite.

29. The method of claim 20, wherein the post processing steps comprise at least roll milling of the elastomer composite for a time sufficient to provide at least about 0.7 MJ/kg of specific energy to the elastomer composite.

30. The method of claim 2, wherein the coupling agent is introduced to the mixture in coagulum reactor.

31. The method of claim 2, wherein the coupling agent is introduced to the mixture after the mixture exits the coagulum reactor.

32. The method of claim 2, further comprising conducting one or more processing steps after the elastomer composite exits the coagulum reactor.

33. The method of claim 32, wherein the processing steps comprise at least one of:
   a) dewatering the mixture to obtain a dewatered mixture;
   b) mixing or compounding the dewatered mixture to obtain a compounded mixture;
   c) milling the compounded mixture to obtain a milled mixture;
   d) granulating or mixing the milled mixture;
   e) baling the mixture after the granulating or mixing to obtain a baled mixture; and
   f) optionally breaking apart the baled mixture and mixing.

34. The method of claim 33, wherein the coupling agent is introduced just prior to and/or during one or more of the steps a) to f).

35. The method of claim 32, wherein the amine-type antioxidant is introduced in the one or more post processing steps.

36. The method of claim 2, wherein the amine-type antioxidant comprises N-(1,3-dimethylbutyl)-N-phenyl-p-phenylenediamine.

37. The method of claim 2, further comprising discharging a substantially continuous flow of the elastomer composite from the coagulum reactor.

38. The method of claim 2, further comprising dry mixing the elastomer composite with additional elastomer to form an elastomer composite blend.

* * * * *